US012421907B2

(12) United States Patent
Lunsford et al.

(10) Patent No.: US 12,421,907 B2
(45) Date of Patent: Sep. 23, 2025

(54) ELECTRONIC FUEL INJECTION THROTTLE BODY ASSEMBLY

(71) Applicant: Holley Performance Products, Inc., Bowling Green, KY (US)

(72) Inventors: Matthew D. Lunsford, Bowling Green, KY (US); Douglas D. Webber, El Paso, TX (US); Cory A. Jeffrey, Winnipeg (CA); Adam A. Layman, Alvaton, KY (US)

(73) Assignee: Holley Performance Products, Inc., Bowling Green, KY (US)

( * ) Notice: Subject to any disclaimer, the term of this patent is extended or adjusted under 35 U.S.C. 154(b) by 0 days.

(21) Appl. No.: 18/771,153

(22) Filed: Jul. 12, 2024

(65) Prior Publication Data

US 2025/0020083 A1 Jan. 16, 2025

Related U.S. Application Data

(60) Provisional application No. 63/513,864, filed on Jul. 15, 2023.

(51) Int. Cl.
*F02D 9/10* (2006.01)
*F02M 57/00* (2006.01)

(52) U.S. Cl.
CPC ........... *F02D 9/109* (2013.01); *F02D 9/1065* (2013.01); *F02M 57/00* (2013.01); *F02D 2200/0404* (2013.01)

(58) Field of Classification Search
CPC ................... F02D 9/109; F02D 9/1065; F02D 2200/0404; F02D 2200/0406; F02D 2200/0414; F02D 9/1095; F02D 2400/11; F02M 57/00
USPC ........................................................ 123/470
See application file for complete search history.

(56) References Cited

U.S. PATENT DOCUMENTS

| | | | |
|---|---|---|---|
| 4,193,947 | A | 3/1980 | Bugamelli |
| 4,224,908 | A | 9/1980 | Bier et al. |
| 4,225,536 | A | 9/1980 | Dougherty et al. |
| 4,230,645 | A | 10/1980 | Dodson |
| 4,246,875 | A | 1/1981 | Bier et al. |
| 4,294,282 | A | 10/1981 | McCabe et al. |
| 4,306,441 | A | 12/1981 | Dodson |
| 4,318,214 | A | 3/1982 | Dodson |
| 4,325,339 | A | 4/1982 | Bier et al. |
| 4,357,283 | A | 11/1982 | Manning |
| 4,434,762 | A | 3/1984 | McCabe |
| 4,434,763 | A | 3/1984 | McCabe et al. |
| 4,465,640 | A | 8/1984 | Dougherty |
| 4,494,488 | A | 1/1985 | Wheatley |
| 4,556,032 | A | 12/1985 | Miller |

(Continued)

FOREIGN PATENT DOCUMENTS

| | | |
|---|---|---|
| AU | 2001014879 | 8/2001 |
| AU | 2002340071 | 6/2003 |

(Continued)

*Primary Examiner* — Hung Q Nguyen
(74) *Attorney, Agent, or Firm* — Dinsmore & Shohl LLP

(57) ABSTRACT

Present embodiments relate to an electronic fuel injection throttle body assembly for an internal combustion engine. More specifically, but without limitation, present embodiments relate to an improved electronic fuel injection (EFI) throttle body which has a remote communication capability as well as improved throttle position sensing.

7 Claims, 13 Drawing Sheets

(56) References Cited

U.S. PATENT DOCUMENTS

| | | | |
|---|---|---|---|
| 4,798,190 | A | 1/1989 | Vaznaian et al. |
| 4,798,329 | A | 1/1989 | Mesenich |
| 4,827,888 | A | 5/1989 | Vaznaian et al. |
| 5,012,780 | A | 5/1991 | Bugamelli |
| 5,091,858 | A | 2/1992 | Paielli |
| 5,111,793 | A | 5/1992 | Deeds |
| 5,123,436 | A | 6/1992 | Koechlein |
| 5,186,147 | A | 2/1993 | Bellis |
| 5,261,382 | A | 11/1993 | Nikolan |
| 5,444,628 | A | 8/1995 | Meaney et al. |
| 5,551,404 | A | 9/1996 | Bauerle et al. |
| 5,807,512 | A | 9/1998 | Grant |
| 5,809,972 | A | 9/1998 | Grant |
| 5,829,422 | A | 11/1998 | Deeds et al. |
| 5,863,470 | A | 1/1999 | Grant |
| 5,865,157 | A | 2/1999 | Romanelli et al. |
| 5,887,569 | A | 3/1999 | Romanelli et al. |
| 5,890,476 | A | 4/1999 | Grant |
| 5,904,130 | A | 5/1999 | Romanelli |
| 6,119,670 | A | 9/2000 | Lavi |
| 6,120,007 | A | 9/2000 | Grant |
| D447,147 | S | 8/2001 | Grant |
| 6,286,817 | B1 | 9/2001 | Grant |
| 6,298,828 | B1 | 10/2001 | Concialdi |
| 6,364,291 | B1 | 4/2002 | Grant |
| 6,378,512 | B1 | 4/2002 | Staggemeier |
| 6,481,698 | B1 | 11/2002 | Calvin et al. |
| 6,520,488 | B1 | 2/2003 | Braswell |
| 6,602,099 | B1 * | 8/2003 | Loberger .............. F02B 61/045 114/89 |
| 6,837,228 | B2 | 1/2005 | Baasch et al. |
| 6,866,027 | B1 * | 3/2005 | Marchesini ............. F02D 11/10 123/480 |
| 6,874,768 | B2 | 4/2005 | Grant |
| 6,901,888 | B2 | 6/2005 | Baasch et al. |
| 6,913,210 | B2 | 7/2005 | Baasch et al. |
| D508,496 | S | 8/2005 | Grant |
| 6,997,401 | B2 | 2/2006 | Baasch et al. |
| 7,066,155 | B2 | 6/2006 | Uhde et al. |
| 7,168,690 | B2 | 1/2007 | Grant |
| D543,555 | S | 5/2007 | Braswell et al. |
| D543,999 | S | 6/2007 | Braswell et al. |
| 7,255,331 | B2 | 8/2007 | Grant |
| D555,668 | S | 11/2007 | Benoit |
| 7,343,896 | B2 | 3/2008 | Grant |
| D574,852 | S | 8/2008 | Grant |
| D578,550 | S | 10/2008 | Benoit |
| 7,634,983 | B2 | 12/2009 | Grant |
| 7,806,096 | B2 | 10/2010 | Grant |
| D648,746 | S | 11/2011 | Tipton et al. |
| D649,979 | S | 12/2011 | Gieske et al. |
| D653,263 | S | 1/2012 | Gieske et al. |
| D655,311 | S | 3/2012 | Gieske et al. |
| D659,164 | S | 5/2012 | Tomlinson et al. |
| D659,714 | S | 5/2012 | Gieske et al. |
| D680,134 | S | 4/2013 | Fordyce et al. |
| D696,300 | S | 12/2013 | Arotzarena et al. |
| D721,389 | S | 1/2015 | Gieske et al. |
| 9,115,671 | B2 | 8/2015 | Benoit |
| 9,212,642 | B2 | 12/2015 | Petersen |
| 9,303,578 | B2 | 4/2016 | Wittkopf et al. |
| 9,376,997 | B1 * | 6/2016 | Farrell ................... F02M 69/54 |
| D760,804 | S | 7/2016 | Shehan et al. |
| 9,441,571 | B2 | 9/2016 | Petersen et al. |
| 9,845,740 | B2 | 12/2017 | Wittkopf et al. |
| D808,435 | S | 1/2018 | Shehan et al. |
| D810,142 | S | 2/2018 | Shehan et al. |
| 10,012,197 | B2 | 7/2018 | Flynn et al. |
| 10,094,353 | B2 | 10/2018 | Bennett et al. |
| 10,294,902 | B2 | 5/2019 | Shehan et al. |
| 10,570,866 | B2 | 2/2020 | Flynn et al. |
| D877,201 | S | 3/2020 | Shehan et al. |
| D900,875 | S | 11/2020 | Bell et al. |
| D900,876 | S | 11/2020 | Bell et al. |
| D902,254 | S | 11/2020 | Whittle |
| D902,257 | S | 11/2020 | Whittle |
| 10,830,195 | B2 | 11/2020 | Shehan et al. |
| 10,859,004 | B2 | 12/2020 | Shehan et al. |
| 10,920,684 | B2 | 2/2021 | Bell et al. |
| D921,049 | S | 6/2021 | Shehan et al. |
| D924,273 | S | 7/2021 | Shehan et al. |
| D925,606 | S | 7/2021 | Shehan et al. |
| 11,118,515 | B2 | 9/2021 | Shehan et al. |
| D933,713 | S | 10/2021 | Bell et al. |
| D938,993 | S | 12/2021 | Bell et al. |
| D938,994 | S | 12/2021 | Bell et al. |
| 11,220,984 | B2 | 1/2022 | Shehan et al. |
| 11,225,916 | B2 | 1/2022 | Shehan et al. |
| 11,333,083 | B2 | 5/2022 | Shehan et al. |
| 11,409,894 | B2 | 8/2022 | Flynn et al. |
| D966,341 | S | 10/2022 | Shehan et al. |
| D968,469 | S | 11/2022 | Bell et al. |
| 11,493,010 | B2 | 11/2022 | Whittle |
| D979,605 | S | 2/2023 | Kangas et al. |
| D989,127 | S | 6/2023 | Bell et al. |
| D995,563 | S | 8/2023 | Bell et al. |
| D999,147 | S | 9/2023 | Bell et al. |
| D1,018,595 | S | 3/2024 | Kangas et al. |
| 12,203,434 | B2 | 1/2025 | Flynn et al. |
| 12,215,659 | B2 | 2/2025 | Whittle |
| 2008/0110436 | A1 * | 5/2008 | Baasch ................. F02D 11/106 123/399 |
| 2009/0145406 | A1 * | 6/2009 | Farrell ................. F02M 69/044 123/470 |
| 2013/0298871 | A1 * | 11/2013 | Bennett .................. F02M 29/04 123/445 |
| 2018/0119656 | A1 * | 5/2018 | Shehan ..................... F02D 9/02 |
| 2019/0345905 | A1 * | 11/2019 | Whittle .................. F02M 69/04 |

FOREIGN PATENT DOCUMENTS

| | | | |
|---|---|---|---|
| AU | 2003287482 | A1 | 6/2004 |
| AU | 339157 | | 10/2011 |
| AU | 340976 | | 2/2012 |
| AU | 340977 | | 2/2012 |
| AU | 340978 | | 2/2012 |
| AU | 341133 | | 2/2012 |
| AU | 348732 | | 5/2013 |
| AU | 348733 | | 5/2013 |
| AU | 348734 | | 5/2013 |
| AU | 356762 | | 8/2014 |
| AU | 201710470 | | 2/2017 |
| AU | 201710471 | | 2/2017 |
| AU | 2013254906 | | 11/2017 |
| AU | 201813353 | | 8/2018 |
| AU | 201813355 | | 8/2018 |
| AU | 201815034 | | 9/2018 |
| AU | 201815036 | | 9/2018 |
| AU | 201816623 | | 12/2018 |
| AU | 201816624 | | 12/2018 |
| AU | 2018378313 | B2 | 6/2019 |
| AU | 2018378315 | B2 | 6/2019 |
| AU | 202010277 | | 3/2020 |
| AU | 202010279 | | 3/2020 |
| AU | 2019267442 | A1 | 11/2020 |
| AU | 2019267570 | A1 | 11/2020 |
| AU | 202112128 | | 5/2021 |
| AU | 2017251869 | B2 | 12/2023 |
| AU | 2024204835 | A1 | 1/2025 |
| CA | 2391589 | A1 | 5/2001 |
| CA | 2832503 | A1 | 5/2014 |
| CA | 184482 | S | 9/2019 |
| CA | 184483 | S | 9/2019 |
| DE | 10393644 | T5 | 12/2005 |
| EM | EU003729599 | | 1/2017 |
| GB | 2409239 | B8 | 10/2012 |
| MX | 57188 | | 11/2018 |
| MX | 58885 | | 11/2020 |
| WO | WO2019112961 | A1 | 6/2019 |
| WO | WO2019112963 | A1 | 6/2019 |
| WO | WO2019217436 | A1 | 11/2019 |

* cited by examiner

ELECTRONIC FUEL INJECTION THROTTLE BODY ASSEMBLY

CLAIM TO PRIORITY

Any and all applications for which a foreign or domestic priority claim is identified in the Application Data Sheet as filed with the present application are hereby incorporated by reference herein and made a part of the present disclosure.

BACKGROUND

1. Field of the Invention

Present embodiments relate to an electronic fuel injection throttle body assembly for an internal combustion engine. More specifically, but without limitation, present embodiments relate to an improved electronic fuel injection (EFI) throttle body assembly which has an improved throttle position sensing as well as a remote communication capability.

2. Description of the Related Art

A carburetion fuel delivery system uses a carburetor to supply and meter the mixture of fuel and air in relation to the speed and load of the engine. Prior art carburetors are often fully mechanical or hydraulic which over time can lead to decrease in proper function. Further, variations in atmospheric temperature and pressure, engine temperature, load and speed are all variable rendering difficult to maximize efficiency and/or performance of prior art carburation. For example, cold engine condition, an engine at idle, and an engine at wide-open throttle all require a rich fuel-air mixture. However, warm engine at cruise requires a lean fuel-air mixture. The airflow also varies greatly, as much as 100 times, between wide-open throttle and idle condition. Still another variable may be fuel formulations and characteristics.

Replacement throttle body systems may be utilized to provide carburetor replacement. However it would be desirable to provide the improved performance of electronic fuel injection. This is especially true for higher performance engines or improving performance and consistency of older engines.

However, when installing these systems, there are multiple variables related to size of throttle body, space on the engine and relative to the vehicle hood, space relative to surrounding engine components.

It would be desirable to improve consistency of operation of an engine throttle body to improve carburetion while also improving performance and/or efficiency. It may also be desirable to provide a throttle body which may be used as a replacement for a carburetor but which is adapted to function with electronic fuel injection. Likewise, it may be desirable to improve electronic fuel injection.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present embodiments relate to carburetor retrofit fuel injection systems. Present embodiments provide an Electronic Fuel Injection Throttle Body Assembly which has one or more bores, electronic fuel injection and improves manner of monitoring throttle position. Additionally, a remote mount communication is provided for the electronic control unit of the throttle body assembly. The fuel injection system also provides for a throttle arrangement to provide this functionality. Still further, plumbing is provided for the throttle body assembly to also provide this functionality.

According to some embodiments, an electronic fuel injection throttle body comprises a throttle body having an upper inlet and an lower outlet, a first bore and a second bore extending through the throttle body between the inlet and the outlet, a throttle valve disposed in each the first bore and the second bore, at least one first fuel injector extending into the throttle body on a first side toward the first bore, at least one second fuel injector extending into the throttle body on a second side toward the second bore, a first throttle shaft extending through the first bore and a second throttle shaft extending through the second bore, at least one the throttle valve mounted on each the throttle shaft, a throttle lever assembly disposed on one side of the throttle body, the first throttle shaft and the second throttle shaft connected to the throttle lever assembly to rotate with movement of the throttle lever assembly, an electronic control unit disposed on an opposite side of the throttle body from the throttle lever assembly, the electronic control unit having a recess which receives an end of one of the first throttle shaft or the second throttle shaft, wherein the end has one of a magnet or sensor to determine a throttle position of the one of the first throttle shaft or second throttle shaft; and wherein, the electronic control unit receiving the end of the first throttle shaft or second throttle shaft, the electronic control unit having the other of the magnet or sensor.

According to some embodiments, the other of the magnet or sensor may be disposed within the recess.

According to some embodiments, the magnet and the sensor may define a throttle position assembly.

According to some embodiments, the electronic fuel injection throttle body may further comprise a magnet housing having the magnet therein, the magnet housing disposed at the end of the first throttle shaft.

According to some embodiments, the magnet housing may be received at least partially within the first throttle shaft.

According to some embodiments, the at least one first fuel injector may be in fluid communication with a channel in the first bore.

According to some embodiments, the at least one second fuel injector may be in fluid communication with a second channel in the second bore.

According to some embodiments, the first channel and the second channel may be disposed above a corresponding the throttle valve.

According to some embodiments, the first channel and the second channel may be disposed below a corresponding the throttle valve.

According to some embodiments, the electronic fuel injection throttle body may further comprise an integral fluid conduit formed in the throttle body extending between opposed sides of the throttle body.

According to some embodiments, the electronic control unit is configured to determine a position of the magnet to determine the throttle position of the one of said first throttle shaft or said second throttle shaft.

According to some embodiments, wherein in response to the determination of an undesirable position of the magnet, execute at least one of an idle algorithm or a wide-open throttle algorithm to change an operation of the electronic fuel injection throttle body.

According to some embodiments, the change of the operation of the electronic fuel injection throttle body is an output to change an operating condition of a combustion engine.

According to some embodiments, an electronic fuel injection throttle body comprises a throttle body having a first bore formed therethrough and including a throttle valve disposed in the first bore, and a second bore formed therethrough and including a second throttle valve disposed in the second bore, a first fuel injector extending into the throttle body and a second fuel injector extending into the throttle body, a channel disposed in each of the bores, the channel in fluid communication with a corresponding of the first fuel injector or the second fuel injector, a plurality of openings in fluid communication with each the channel, whereby fuel is injected from the fuel injector into the bore through the plurality of openings, a remote short range communications module configured for, providing and receiving data remotely from said electronic fuel injection throttle body, an electronic control unit mounted to a side of the throttle body, and communicatively coupled to said remote short range communications module; and a non-transitory, processor-readable storage medium in communication with the electronic control unit, the non-transitory, processor-readable storage medium comprising one or more programming instructions that, when executed, cause the electronic control unit to transmit and receive a plurality of data through the remote short range communications module to an external computing device, receive inputs from the remote short range communications module in response to the plurality of data, and output control signals to the electronic fuel injection throttle body to change an operating condition of a combustion engine.

According to some embodiments, the control signals output by the electronic control unit to the electronic fuel injection throttle body adjust at least one of an air-fuel ratio target, an idle speed, a timing change, and a fuel enrichments.

According to some embodiments, the electronic fuel injection throttle body may further comprise an integral fluid conduit formed in the throttle body extending between opposed sides of the throttle body.

According to some embodiments, an electronic fuel injection throttle body comprises a throttle body having an upper inlet and an lower outlet, a first bore and a second bore extending through said throttle body between said upper inlet and said lower outlet, a throttle valve disposed in each said first bore and said second bore, at least one first fuel injector extending into said throttle body on a first side toward said first bore, at least one second fuel injector extending into said throttle body on a second side toward said second bore, a first throttle shaft extending through said first bore and a second throttle shaft extending through said second bore, at least one said throttle valve mounted on each said throttle shaft, a throttle lever assembly disposed on one side of said throttle body, said first throttle shaft and said second throttle shaft connected to said throttle lever assembly to rotate with movement of said throttle lever assembly, and an electronic control unit disposed on an opposite side of said throttle body from said throttle lever assembly, said electronic control unit having a recess which receives an end of one of said first throttle shaft or said second throttle shaft, wherein said end having a magnet to determine a throttle position of said one of said first throttle shaft or said second throttle shaft and wherein said electronic control unit receiving said end of said first throttle shaft or second shaft, said electronic control unit having the other of said magnet, and a non-transitory, processor-readable storage medium in communication with the electronic control unit, the non-transitory, processor-readable storage medium comprising one or more programming instructions that, when executed, cause the electronic control unit to determine a position of the magnet to determine the throttle position of the one of said first throttle shaft or said second throttle shaft, transmit and receive a plurality of data through a remote short range communications module to an external computing device, receive inputs from the remote short range communications module in response to the plurality of data; and in response the determination of an undesirable position of the magnet, execute at least one of an idle algorithm or a wide-open throttle algorithm to change an operation of the electronic fuel injection throttle body.

According to some embodiments, the change of the operation of the electronic fuel injection throttle body is an output to change an operating condition of a combustion engine.

According to some embodiments, wherein in response to a determination of a rapid changes in throttle angle or position based on the determination of an undesirable position of the magnet, execute an acceleration fuel enrichment by the electronic fuel injection throttle body to cause an increase in a throttle response in a combustion engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of the electronic fuel injection throttle body system will now be described by way of examples. These embodiments are not to limit the scope of the claims as other embodiments of the electronic fuel injection throttle body system or assembly will become apparent to one having ordinary skill in the art upon reading the instant description. Non-limiting examples of the present embodiments are shown in figures wherein:

DETAILED DESCRIPTION

Figure 1:
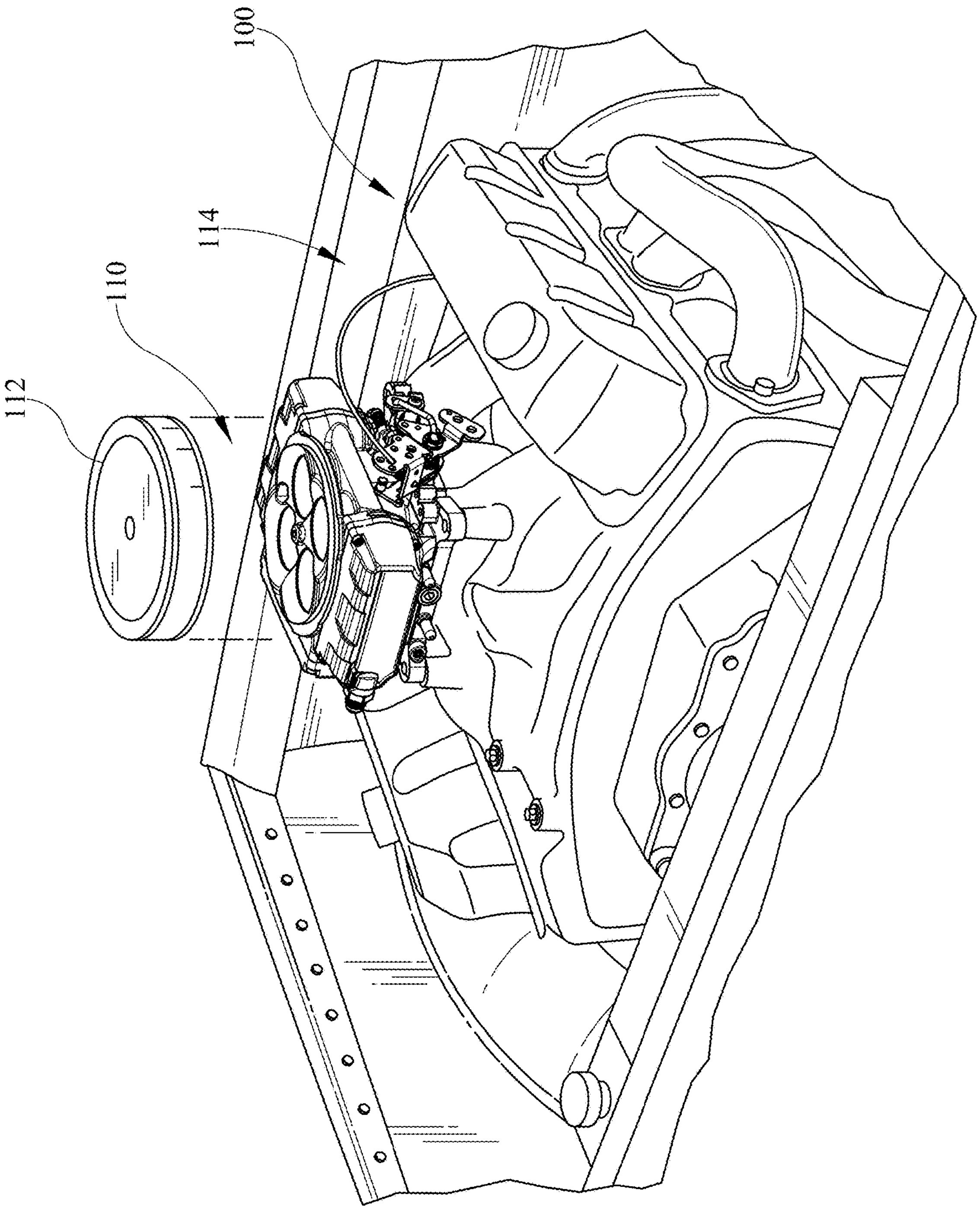
FIG. 1 is a perspective view of an illustrative non-limiting combustion engine and an electronic fuel injection throttle body assembly.

It is to be understood that the electronic fuel injection throttle body assembly is not limited in its application to the details of construction and the arrangement of components set forth in the following description or illustrated in the drawings. The throttle body assembly is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Referring now in detail to the drawings, wherein like numerals indicate like elements throughout several views, there are shown in FIGS. 1-13 various embodiments of an electronic fuel injection throttle body fuel assembly. Present embodiments pertain to an electronic fuel injection throttle body assembly which may be used to replace older carburetor assemblies, as part of a restoration, or as a new assembly, and provide improved function of electronic fuel injection. The electronic fuel injection throttle body provides improved manner of monitoring throttle shaft position.

As used herein, the term "communicatively coupled" means that coupled components are capable of exchanging data signals and/or electric signals with one another such as, for example, electrical signals via conductive medium, electromagnetic signals via air, optical signals via optical waveguides electrical energy via conductive medium or a non-conductive medium, data signals wirelessly and/or via conductive medium or a non-conductive medium and the like.

With reference to FIG. 1, a partial perspective view of an engine compartment 114 is depicted wherein a combustion engine 100 is provided with an electronic fuel injection (EFI) throttle body assembly 110 and an air filter 112. The engine 100 is illustrative as one or more throttle body assemblies 110 may be utilized and one or more filter configurations may be used to deliver air to the one or more throttle body assemblies 110. Moreover, although the throttle body assembly 110 is depicted in an orientation, this is not limiting as other orientations may be utilized and may be dependent upon the engine type and configuration of fuel lines and throttle linkage. The combustion process, as one of skill in the art will know, combines fuel and air with an ignition source. The instant throttle body assembly 110 is mounted to the engine 100 directly, such as at the engine manifold, and receives air through the air filter 112. The assembly 110 also receives fuel from a fuel tank and mixes the two for the ignition which occurs in the engine 100. In other non-limiting embodiments, the assembly 110 may be mounted to the engine indirectly such as to a supercharger.

The EFI throttle body assembly 110 is configured to be compact allowing use in a variety of configurations. Due to the wide variety of engine manufactures and vehicle types and sizes, it may be desirable, in some non-limiting embodiments, to provide a structure which may be used in many of these vehicles/engines. This also requires consideration of space relative to the engine hood and space relative to surrounding engine components. It may also be desirable to provide a device of minimal height, for example less than about 5 inches, a forward to rear length of about 13 inches and a side to side length of about 9 inches. These dimensions are merely illustrative of a non-limiting embodiment, but provide a compact design desirable for use across many engine sizes and vehicle types. Other sizes may be utilized. Still further, it may be desirable to provide a size which approximates a carburetor which may be in process of being replaced.

Figure 2:
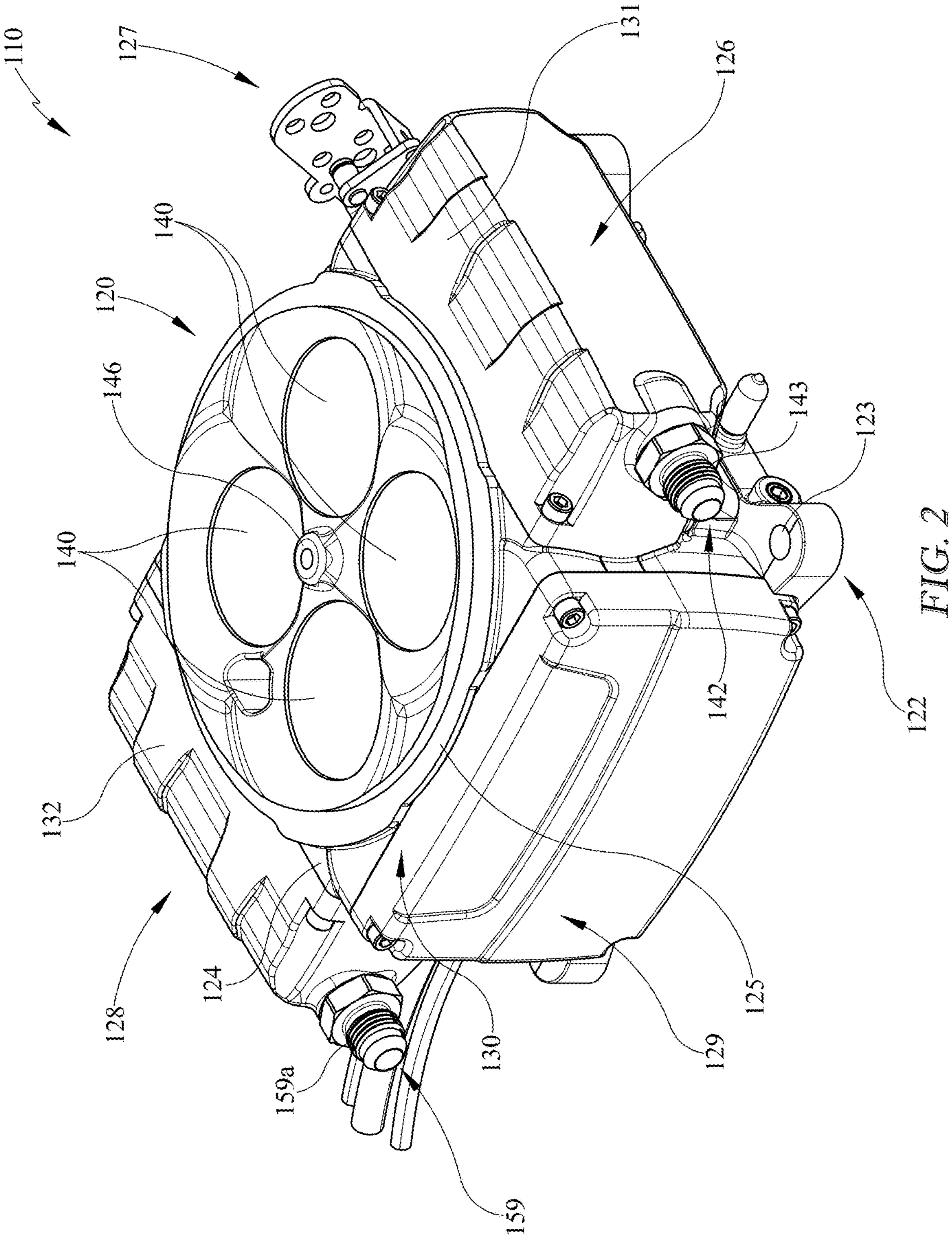
FIG. 2 is an upper perspective view of the electronic fuel injection throttle body assembly of FIG. 1 removed from the engine.

With reference now to FIG. 2, a first upper perspective view of the electronic fuel injection throttle body assembly 110 is depicted. The throttle body assembly 110 includes a throttle body 120 having a mounting base 122 and a main body 124 which extends upwardly from the base 122. A stand 146 is provided between the bores 140 which supports a fastener (not shown) extending through the throttle body 120 or oppositely may extend downwardly through the air filter to engage the stand 146. In some examples, the stand 146 may be defined by a threaded boss, however, this is merely one example and other structures may be used alternatively, such as a threaded rod for example. The fastener may extend upwardly for engagement and connection of the air filter 112 (FIG. 1). The upper end of the main body 124 may include an upper flange 125. This may define a seat or upper limit for positioning of air intake structure, such as filter 112 for example, above the throttle body assembly 110. The base 122 may have a plurality of holes 123 for mounting the assembly 110 wherein the multiple holes 123 provide any of various known bolt patterns for connection of the assembly 110 to an engine manifold. For example, in some embodiments, four bolts or screws may be used to mount the base 122; however, this is not intended to be limiting as any number of bolt patterns may be used.

The depicted embodiment shows a four barrel throttle body assembly. These barrels are also commonly referred to as bores 140 throughout this description—the terms may be considered interchangeable. Additionally, more than one throttle body assembly 110 may be used in the engine 100 (FIG. 1) depending on the engine type and configuration of intakes. This may be necessary for high horsepower arrangements where higher amounts of fuel and air are required.

The front of the throttle body assembly 110 is shown in the instant view. For purpose of directional reference, but not limiting, a front side 126 of the throttle body assembly 110 is shown and a rear side 128, and lateral sides 127 and 129. One lateral side 129 of the throttle body assembly 110 may include an electronic control unit (ECU) cover 130. As will be described in further detail herein, the cover 130 conceals and contains an electronic control unit 190 (FIG. 7), which may be mounted to the throttle body 120 or within the cover 130, or a combination thereof. This cover 130 may be fastened to the throttle body 120 or otherwise connected thereto.

The throttle body assembly 110 also comprises a first side 127 and second side 129, which are labeled for ease of reference in description. Again the term "side" is merely descriptive as all of the surroundings of the assembly 110 may be considered sides or ends and further should not be considered limiting as to any specific area of the throttle body 120. The throttle body front and rear sides 126, 128 include fuel components which also function as covers 131, 132. The fuel component covers 131, 132 are mounted on opposite sides of the throttle body 120. Further for example, the illustrative embodiment includes the component covers 131, 132 on the front and rear sides 126, 128. The fuel component covers 131, 132 provide a cover for a fuel pathway 133 and define the fuel passageway therein, which will be described in greater detail herein. The fuel component covers 131, 132 are fastened to the throttle body 120 and the ECU cover 130 is mounted and fastened to the front of the body 120 therebetween. Again, the sides may differ in mounting position in other embodiments as the descriptions are not limiting. Throughout the specification, the fuel component covers 131, 132 may additionally be referred to as inlet cover 131 or outlet cover 132. This inlet or outlet description is merely illustrative of one embodiment but one skilled in the art should realize that the fuel flow direction may be reversed in some embodiments and therefore, the terms "inlet" and "outlet" should not be considered limiting. For purpose of orientation description, and not to be considered limiting, the inlet fuel component cover 131 is located at the front side 126 and the outlet fuel component cover 132 is located at the rear side 128.

In addition to providing one or more fuel passageways in the component covers 131, 132, these structures also cover fuel injectors 1170$_x$ (FIGS. 4-5) that are mounted in the throttle body 120. With the electronic control unit cover 130 positioned on the side 126, for purpose of description only the front side, of the throttle body assembly 110 adjacent to the component covers 131, 132, the wire extending between the electronic control unit 190 (FIG. 7) and each of the fuel injectors 1170$_{1-4}$ may remain substantially unexposed.

The fuel component covers 131, 132 are also shown in FIG. 2. The fuel component cover 131 may comprise one or more inlet fittings 143 which may define one or more fuel inlets 142. In some embodiments, fitting 143 may be a standard fitting such as an SAE or similar automotive fitting for ease of use and/or replacement. While one fitting and inlet are shown, in some embodiments, multiple inlets/fittings may be provided to provide additional plumbing options. In still further embodiments, when the flow is reversed, the inlet may become an outlet. In still further alternatives, additional fittings may be provided for use with a wet nitrous system for example, fuel may be supplied by one of the inlets if desirable to a nitrous solenoid in order to provide for use.

Figure 4:
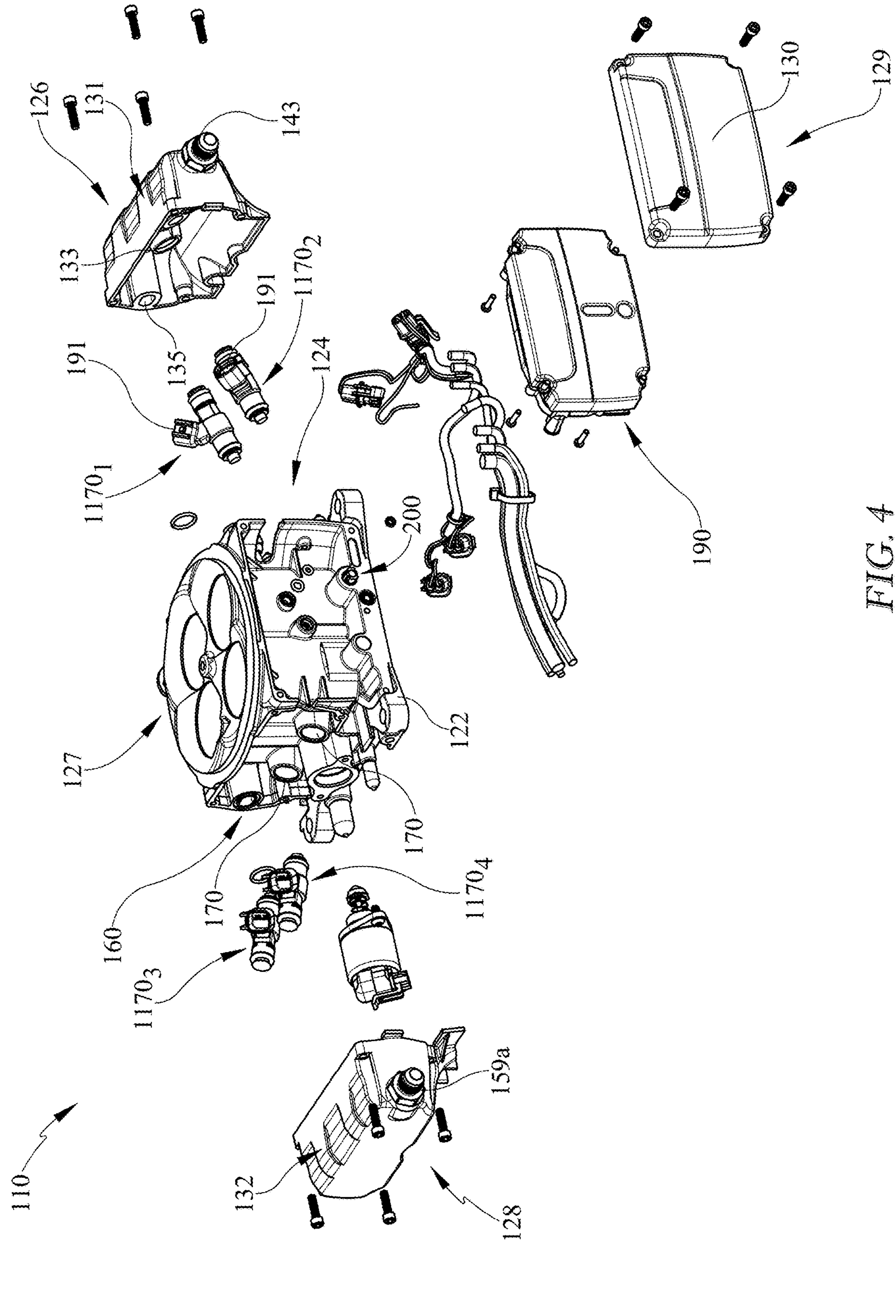
FIG. 4 is a partially exploded perspective view of the electronic fuel injection throttle body assembly.

In some embodiments, each fuel component covers 131, 132 may include a connecting fuel passage 161 (FIG. 4). These fuel passages 161 may be oriented substantially horizontally between injectors 1170$_x$. Fuel is routed to both fuel covers 131, 132, and this may be achieved in a variety of methods. In the depicted embodiments, a fuel crossover tube 160 may be used to fluidly connect the covers 131, 132. In the instant embodiment, the fuel crossover tube 160 extends from the first fuel component cover 131 to the second fuel component cover 132. The fuel crossover tube 160 may be formed in the throttle main body 124.

On the opposite side 129 from the inlet 142, is an outlet 159. Similar to the inlet 142, the outlet 159 may comprise one or more fittings. If more than one fitting is provided, this may provide additional plumbing locations for ease of connection within the engine compartment 114. The outlet 159 is formed as part of the fuel component cover 132. In some embodiments, the outlet 159 may also comprise a pressure regulator. Both of the fuel component covers 131, 132 are removable for maintenance and during installation of the assembly 110. The fuel is directed through the outlet 159 after all injectors have been charged and only at that time does the fuel return to a fuel tank or regulator. In other embodiments, the fuel plumbing may be a returnless system where fuel is supplied to one side of the throttle assembly at either the inlet or the outlet, and the other of the inlet and outlet side are plugged so that fuel does not return to a fuel tank. With brief reference to FIG. 7, the fuel flow is depicted by arrows moving through the assembly 110. In alternative returnless fuel flow arrangement, the arrows could be in the direction depicted or in an opposite direction. Additionally, while one inlet and one outlet are shown, in some other embodiments, two or more inlets and two or more outlets may be utilized. Still further, either of the fittings 143, **159*a* may be the inlet and the other be the outlet. In other words, the flow through the assembly 110** may be reversed from that which is shown.

Also shown in the view of FIG. 2, are a plurality of bores 140. The bores 140 are spaced about an upper surface of the flange 125 and are comprised of equal sizes or diameters extending between the upper inlet and the lower outlet of the throttle body 120. The bores 140 provide a mixture of air and fuel to the engine manifold. As depicted, in some embodiments the bores 140 are all the same size diameter. In other embodiments however, the bores may be of differing sizes, for example two smaller diameter and two larger diameter. In such latter example, the engine may be operated in two manners. First, by way of fuel delivery from the small bores for more fuel efficient engine operation. However, when higher performance is desired, the larger bores may be utilized, in addition to the small bores, to deliver additional fuel and air to the engine, thereby provide additional horsepower. The bores 140 may be aligned in a horizontal direction to cooperate in pairs with one fuel component cover 131, or the other fuel component cover 132.

The upper surface of the flange 125 may include one or more locating features disposed thereon to locate an air filter thereon. The features may be wall like structures extending upwardly which inhibit rotation of the air filter due to engine vibration.

Figure 3:
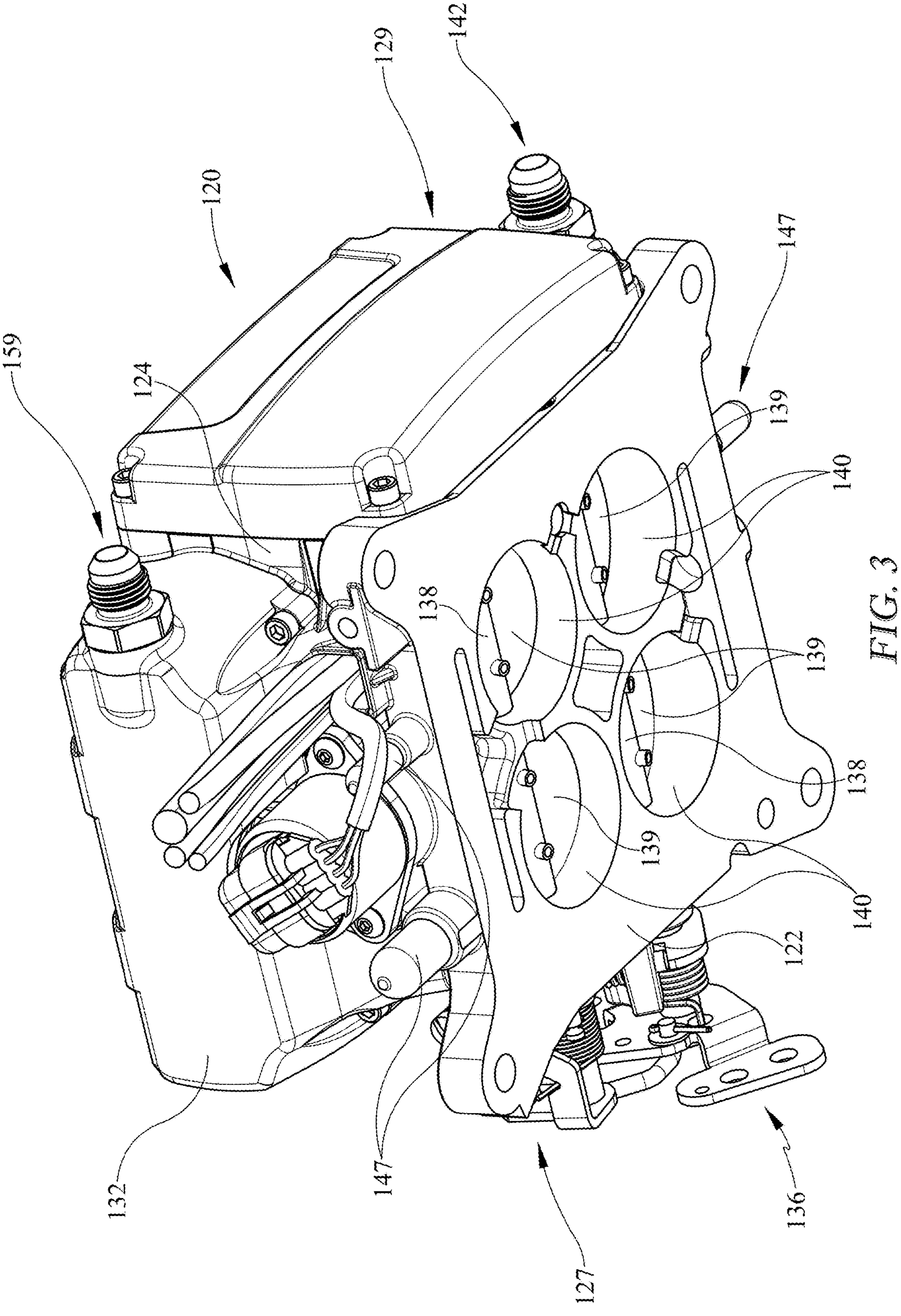
FIG. 3 is a lower perspective view of the electronic injection throttle body assembly.

Referring now to FIG. 3, a lower rear perspective view of the assembly 110 is depicted for description. Whereas the upper end of the throttle body 120 and the bores 140 define an inlet, the lower end of the bores 140 define an outlet which is in flow communication with the engine manifold (not shown) and provides fuel and air mixture to the manifold. Accordingly, in the depicted embodiment the airflow moves downwardly through the throttle body 120 from an upper inlet to a lower outlet.

Extending between the fuel component covers 131 (FIG. 2), 132 is the fuel crossover tube 160, which is formed in the throttle body 120. The crossover tube 160 is hidden from the view by the throttle lever assembly 136, which is sometimes also referred to as a throttle linkage. The fuel circuit is arranged as follows. The fuel enters at the fuel inlet 142 and passes through the fuel component cover 131. Within the fuel component cover 131, the fuel is delivered to the one or more fuel injectors $\mathbf{1170}_{1,2}$ (FIG. 4) therein. Once the fuel injectors $\mathbf{1170}_{1,2}$ are pressurized, the fuel then passes through the fuel crossover tube 160 and to the second fuel component cover 132. In the second fuel component cover 132, the fuel is delivered to fuel injectors $\mathbf{1170}_{3,4}$ therein until they are also pressurized. Afterward, the fuel may pass to the fuel outlet 159 which is generally located at a corner of the fuel component cover 132. Upon exiting the second component cover 132, the fuel may return to a fuel tank in the vehicle or recirculate back to the inlet side of the electronic fuel injection throttle body assembly 110. Additionally, in some embodiments, a fuel pressure regulator may be disposed at the inlet 142 or the outlet 159.

FIG. 3 also illustrates that the base 122 may include various pipe ports 147 where, for example where some vehicle engines require vacuum ports. For example, a manifold vacuum port, distributor spark and/or other services may be provided along, or near the base 122 and on the throttle body 120. The ports 147 may be plugged at time of manufacture and unplugged by the end user to make these ports functional.

The side 127 of the assembly 110 also comprises a throttle lever assembly 136 or linkage. The throttle lever assembly 136 is typically mounted toward the driver side of the vehicle with the gas pedal also located on the same corresponding side, the left hand side of the vehicle. The throttle lever assembly 136 includes a throttle shaft 138 extending through the bores 140 and valves or valve plates 139. The lever assembly 136 causes opening or closing of the valve or valve plates 139 by rotation of the shaft 138. When viewed from the top of the bores 140, the shaft 138 may be above or below the valve plates 139.

In the depicted embodiment, since there are four bores 140, there are two throttle shafts 138. Each of the throttle shafts 138 extend through two of the bores 140. Additionally, the valve plates 139 may also operate in at least two ways. In one manner of operation, the throttle lever assembly may rotate the valve plates 139 at the same rate. In a second manner of operation, the valve plates 139 on one throttle shaft 138 may operate at one speed, and the valve plates on the second throttle shaft may operate at a second speed, different from the first throttle shaft. Since the bores 140 are not all utilized at the same time, the valves are configured to open at different rates. This secondary manner of operation may be more appropriate for embodiments where bore sizes differ. In some embodiments for example, the valves 139 associated with the small bores may be continuously operating and the valves of the large bores open when the valves of the small bore reach a preselected position and additional performance from the engine is required. When the small valves are fully open however, the large valves will also be fully opened to provide maximum engine performance. Thus the large valve plates may rotate at differing rate than the smaller valve plates.

Figure 5:
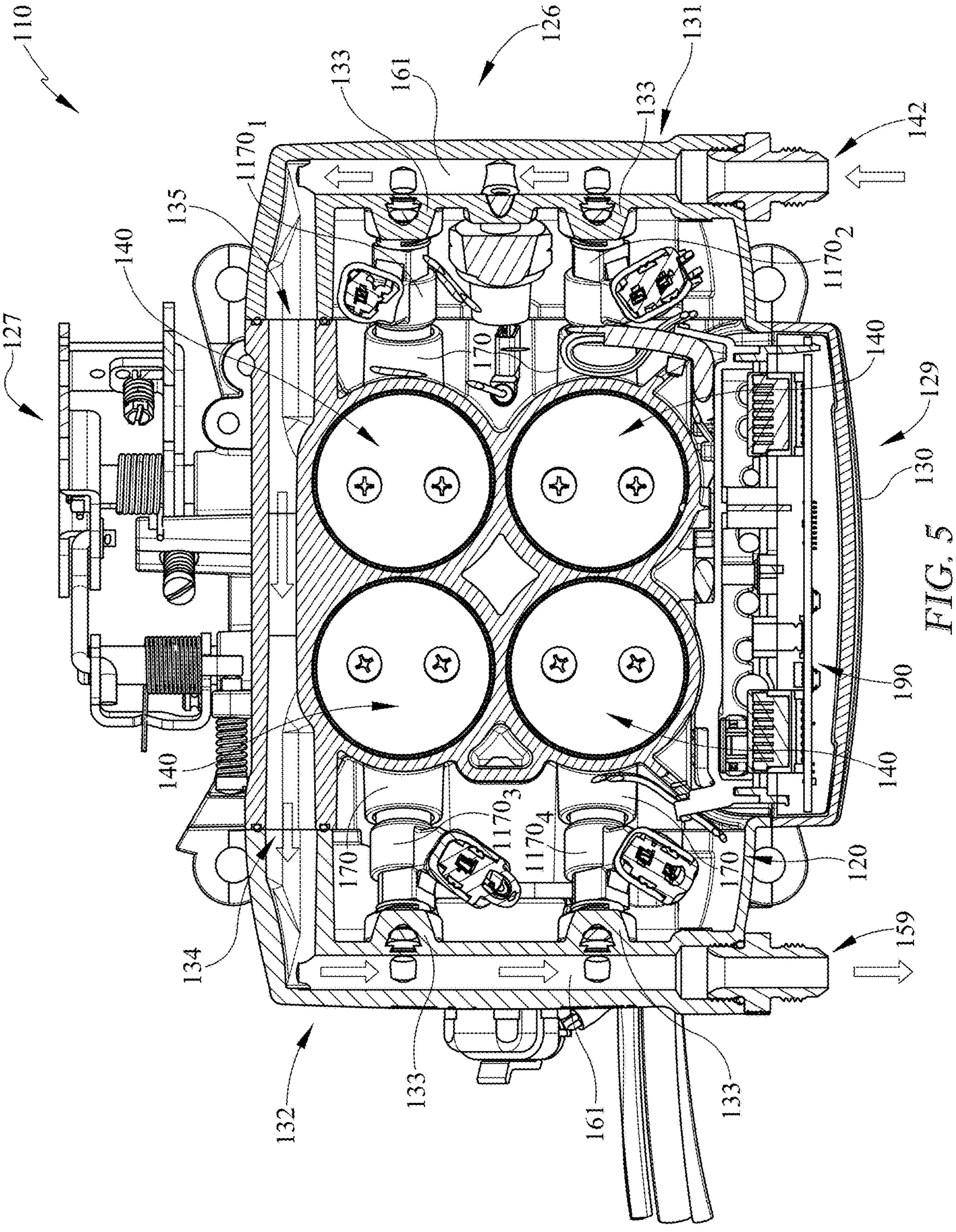
FIG. 5 is an upper section view of the throttle body assembly of FIG. 1.

With reference now to FIG. 4, an exploded perspective view of the throttle body assembly 110, and FIG. 5, are shown with the assembly 110 rotated to provide view of the first side 127 and the opposite second side 129. Referring first to FIG. 4, an exploded upper perspective view of the throttle body assembly 110 is shown. The inlet fuel component cover 131 is removed to reveal two fuel injectors $\mathbf{1170}_{1,2}$ which are disposed in ports 170. The fuel may enter the inlet fitting 143, for example, and pass through an internal passage 161 (FIG. 4) of the component cover 131. The fuel passage 161 is in flow communication with the fuel injectors $\mathbf{1170}_x$ and the fuel moves to a crossover port 135 which is in flow communication with the crossover tube 160.

In the view, the fuel injectors 1170*x* are also shown with electrical connectors 191 which are in electrical communication with the electronic control unit 190 (FIG. 7) within the cover 130.

The inlet fuel component covers 131, 132 are exploded from their connected position on the main throttle body 120. In the depicted view, the fuel component cover 132 is also shown. In this view the fuel injector ports 170 are shown which receive a portion of the fuel injectors $\mathbf{1170}_{3,4}$. A fuel passage 161 is also shown in the fuel component cover 132 and extending between the ports 170. The passage 161 provides fuel flow between the two fuel injectors $\mathbf{1170}_x$ from a crossover port 134 of the fuel component cover 132.

The bores 140 may have a plurality of holes which allow for fuel from the injectors to enter the bores 140 and mix with the air. In some embodiments, the plurality of holes may be formed in the sidewall of the bore. In some embodiments, the plurality of holes may be formed in a ring which is axially aligned with and pressed into each of the bores 140. In either embodiment, the plurality of holes may be in fluid communication with a channel extending about the bore and which may be formed so that fuel moves around the channel through the plurality of holes and then into the bore. The holes may be radially aligned or may be off-angle from the radial direction. Additionally, the holes may have an axis that extends horizontally or the axis may extend at an angle to a horizontal reference to spray fuel upwardly or downwardly into the bore, for example at an angle of about 45 degrees. The hole size and number of holes may vary depending on the desired fuel rate and the desired characteristics of the fuel spray entering the bore. In some embodiments, the plurality of holes may comprise 16 holes and each may be a diameter of 0.0225". However, this is only one non-limiting example.

Referring still to FIG. 5, an upper section view of the EFI throttle body assembly 110 is shown. The view depicts an exemplary fuel flow through the assembly 110 from the inlet 142 to the outlet 159. The fuel inlet 142 provides fuel into the fuel component cover 131 and to each of the fuel injectors $\mathbf{1170}_{1\text{-}2}$ depicted. The fuel injectors $\mathbf{1170}_{1\text{-}2}$ may be horizontally positioned or may be at an angle in a vertical plane to a horizontal axis. Similarly, the fuel injectors $\mathbf{1170}_1$, $\mathbf{1170}_2$ may be centered relative to the corresponding bores 140 or may be off-center as shown. Still further, while the instant depicted embodiment shows a single fuel injector for each bore 140, it may be that each bore has two or more fuel injectors, for example which may be vertically arranged one above the other.

As previously described, once the fuel injectors $\mathbf{1170}_{1,2}$ are pressurized, the fuel is directed from the fuel component cover 131 to the fuel crossover tube 160. As the fuel passes through the fuel crossover tube 160, the fuel moves to the fuel component cover 132. Within the component cover 132 are the fuel injectors $\mathbf{1170}_{3,4}$ and these injectors direct fuel into the corresponding bores 140. The fuel injectors $\mathbf{1170}_{3,4}$ are shown in a horizontal arrangement relative to a vertical plane and may be centered or off center relative to the bores $\mathbf{140}_b$. Once this side of the assembly 110 is pressurized with fuel, the fuel may pass through the outlet 159 at one or more fittings $\mathbf{159}_a$.

Also shown in FIG. 5 is an electronic control unit (ECU) 190 which is disposed within the ECU cover 130. The cover 130 is connected to the throttle body 120, for example by fasteners or otherwise removably connected. The electronic control unit 190 may include a circuit board, and may further comprise memory to which operating code may be flashed. The electronic control unit 190 may be connected to the cover 130 for example by one or more fasteners and may also be potted to reduce effects of contaminants, water, noise, vibration or other environmental influences. Alternatively, the electronic control unit 190 may be connected to the throttle body 120 and then covered by the cover 130, and may optionally be potted as well. The electronic control unit 190 or "controller" is used herein generally to describe various apparatus relating to the monitoring of engine data, user input and the performance of one or more actions in response to occurrence of certain engine sensor data or action from user. A controller can be implemented in numerous ways (e.g., such as with dedicated hardware) to perform various functions discussed herein. A "processor" is one example of a controller which employs one or more microprocessors that may be programmed using software (e.g., microcode), logic, and the like, to perform various functions discussed herein.

A controller may also include a circuit board and may be implemented with or without employing a processor, and also may be implemented as a combination of dedicated hardware to perform some functions and a processor (e.g., one or more programmed microprocessors and associated circuitry) to perform other functions. Examples of controller components that may be employed in various implementations include, but are not limited to, conventional microprocessors, application specific integrated circuits (ASICs), and field-programmable gate arrays (FPGAs).

In various implementations, a processor or controller may be associated with one or more storage media (generically referred to herein as "memory" e.g., volatile and non-volatile computer memory such as RAM, PROM, EPROM, and EEPROM, floppy disks, compact disks, optical disks, magnetic tape, etc.). In some implementations, the memory may be encoded with one or more programs that, when executed by the controller, perform at least some of the functions discussed herein. Memory may be fixed within a processor or controller or may be transportable, such that the one or more programs stored thereon can be loaded into a processor or controller so as to implement various aspects of implementations disclosed herein.

Further, a non-transitory, processor-readable storage medium may be in communication with the controller or processor. The non-transitory, processor-readable storage medium may comprises one or more programming instructions that, when executed, cause the controller or processor to perform the functions as described herein, such as configured to receive, analyze and process sensor data, perform calculations and mathematical functions, convert data, generate data, and the like, and provide control signals to control the combustion engine 100.

The ECU 190 may also have integrated into its circuitry and/or be communicatively coupled to a Manifold Absolute Pressure (MAP) sensor and/or Intake Air Temperature (IAT) sensor. Both the MAP and IAT sensors provide feedback to the ECU 190 on environmental conditions that effect the fuel requirements of the engine for proper combustion of the air/fuel mixture. For example, the MAP sensor monitors the absolute air pressure below the throttle valve plates at the engine manifold and the IAT sensor monitors the temperature of the air entering the bores 140.

Figure 6:
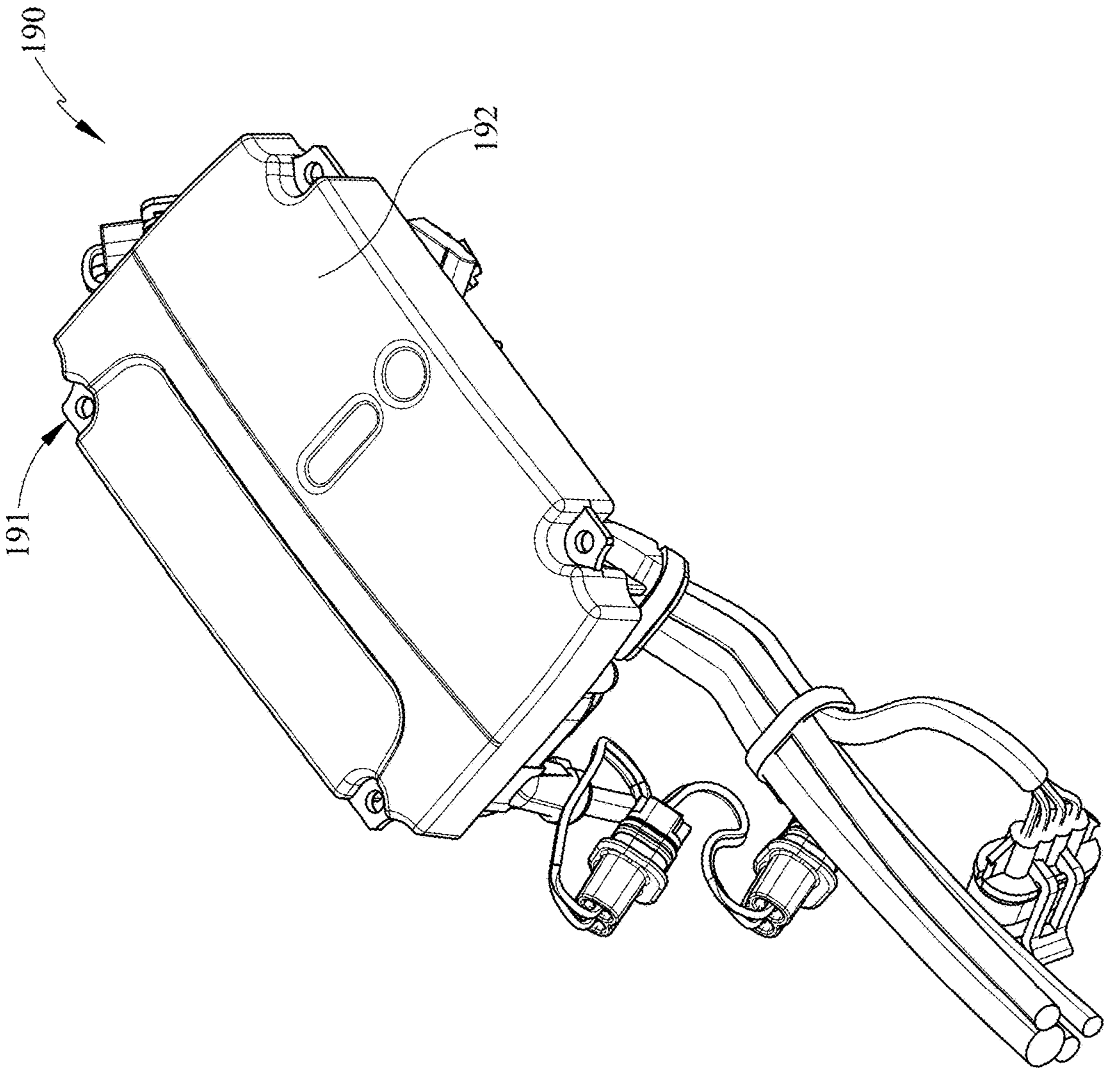
FIG. 6 is a perspective view of an electronic control unit with the cover removed.

With reference now to FIG. 6, a perspective view of the electronic control unit (ECU) 190 is shown with the ECU cover 130 (FIG. 5) removed. An ECU housing 192 may be formed in some embodiments by a potting material that is formed on and around a circuit board 191. The housing 192 may comprise various shapes but in some embodiments is sized to fit on or around the side 129 of the throttle body 120. The front of the housing 192 has a generally rectangular shape and includes holes for fastener connection to the throttle body 120, or alternately comprises recessed areas where holes in the circuit board 191 may be located to receive fasteners. The housing 192 may be connected to the throttle body 120 by fastening the holes of the circuit board 191 to the throttle body, and then fastening the ECU cover 130 over the housing 192 and circuit board 191 to the throttle body 120.

Figure 7:
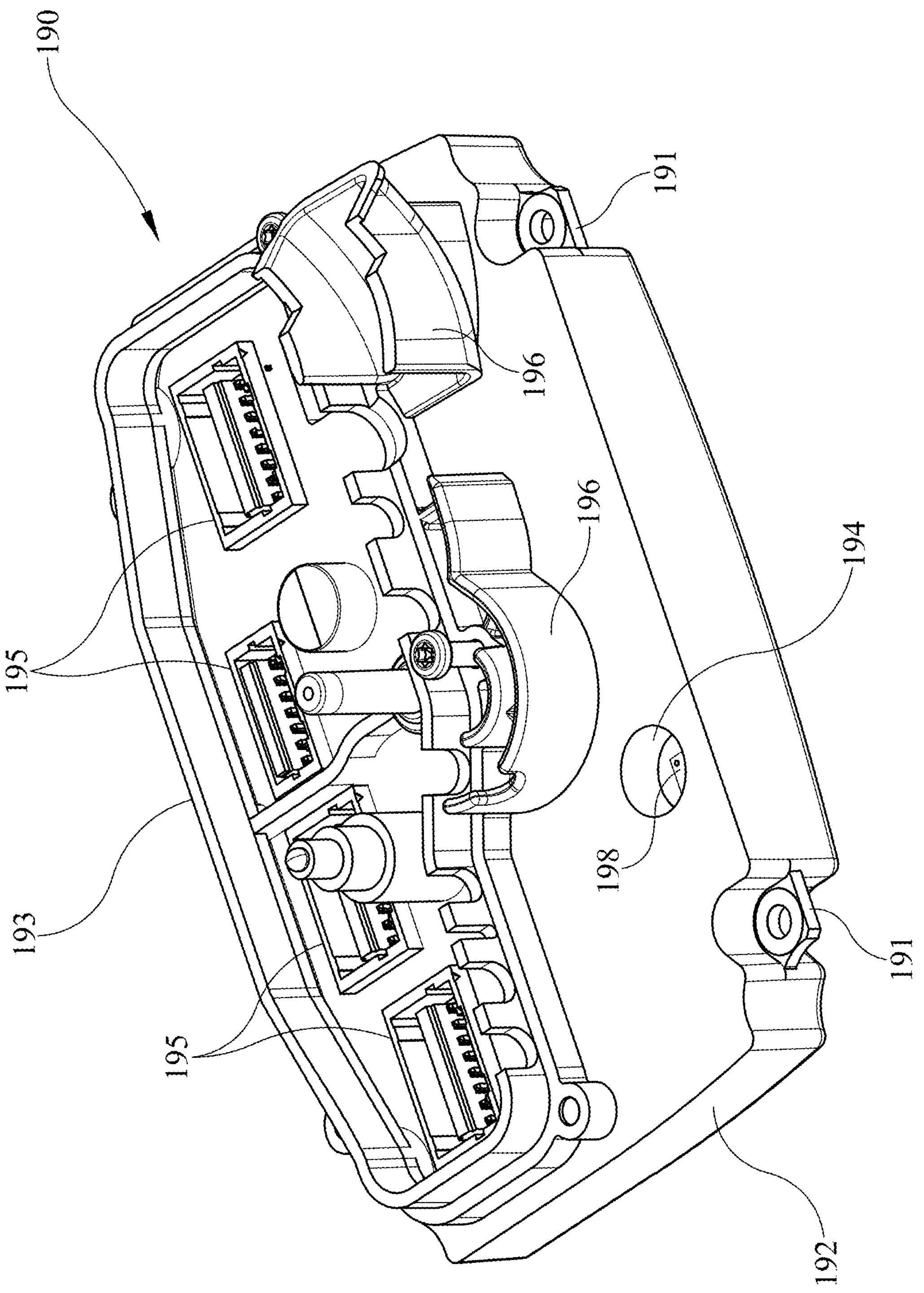
FIG. 7 is a rear perspective view of the electronic control unit of FIG. 6.

With additional reference to FIG. 7, a rear perspective view of the electronic control unit 190 is shown. On the rear of the electronic control unit 190, and specifically the housing 192, a housing frame 193 is provided. The housing frame 193 is connected to the ECU 190 and/or the housing 192 and may be connected by fastener. Once the frame 193 and ECU 190 are connected, the potting material defining housing 192 may be added to define a single structure. The housing frame 193 may or may not surround the entire circuit board 191. In the instant embodiment, the housing frame 193 is an open structure that exposes connectors on the circuit board 191.

Also shown on the rear of the electronic control unit 190, is a recess 194 which receives an end of the throttle shaft 138. The receipt of the end of the throttle shaft 138 allows for positioning to monitor rotational position of the throttle shaft 138. Accordingly, the recess 194 in the rear of the electronic control unit 190 is located in a position that corresponds to at least one of the throttle shafts 138 which extends through the throttle body 120.

Figure 8:
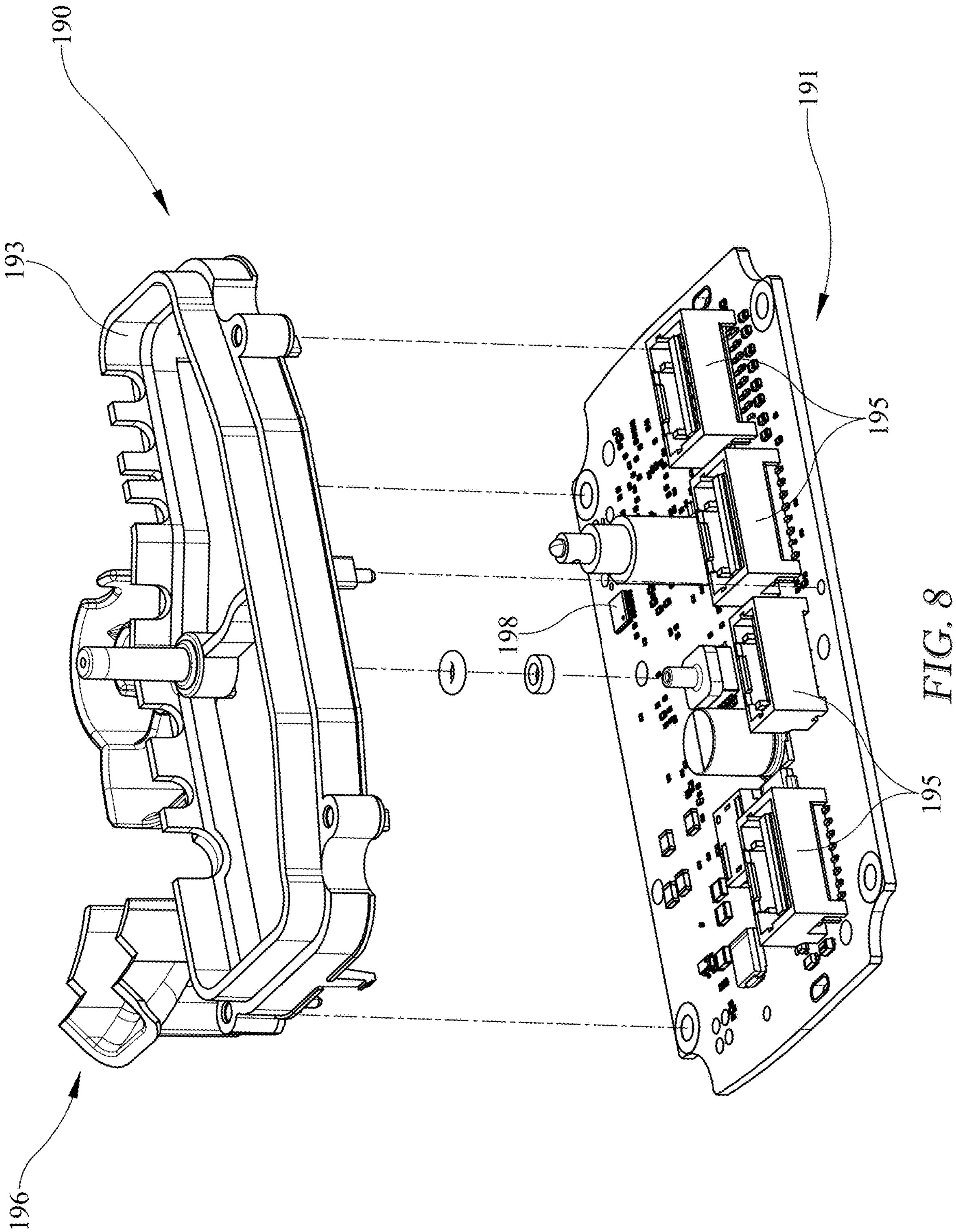
FIG. 8 is an exploded view of a circuit board and rear housing frame.

With additional reference to FIG. 8, an additional exploded view of portions of the electronic control unit 190 is shown. In the view, the circuit board 191 is shown along with the housing frame 193 which is exploded from the rear of the circuit board 191. The housing frame 193 has a shape which follows a perimeter of at least a portion of the circuit board 191. The at least one circuit board 191 may comprise on-board programming in memory. The example circuit board 191 may include, without limitation, a printed circuit board, stripboard, perfboard, breadboard, and the like. Further, the at least one circuit board 191 may include a sandwich structure of conductive and insulating layers where each of the conductive layers may include a pattern of traces, planes and other features etched from one or more sheet layers of copper, or other conductive material, that may be laminated onto and/or between sheet layers of a non-conductive substrate. Further, the one or more circuit boards 191 may be single-sided, double-sided, multilayer, rigid, flexible, rigid-flex, combinations thereof, and the like. The circuit board 191 may also comprise memory to store programming instructions and/or historical data such as, for example but without limitation, look-up tables for comparison.

The electronic control unit 190 may include a processor, a memory, an optional storage device, a high-speed interface connecting to the memory and one or more ports, and a low-speed interface connecting to a low-speed port and the storage device. Each of the processor, the memory, the storage device, and the ports are interconnected using various busses, and may be mounted on a common motherboard or in other manners as appropriate. The electronic control unit 190 can process instructions for execution, including instructions stored in the memory or on the storage device. Additionally, the electronic control unit 190 may provide information to display graphical information for a GUI on an external input/output device, such as a computing device including but not limited to a mobile computing device (e.g., the smart devices 356 or external computing devices 365 of FIG. 13). A computer device and a mobile computing device that may be used to implement the computer-implemented methods and other techniques described herein. The computing device may comprise various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document. For example, the mobile computing device may be implemented in a number of different forms, such as a cellular telephone. The mobile computing device includes a processor, a memory, an input/output device such as a display, a communication interface, and a transceiver, among other components. The mobile computing device may also be provided with a storage device, such as a micro-drive or other device, to provide additional storage. Each of the processor, the memory, the display, the communication interface, and the transceiver, are interconnected using various buses, and several of the components may be mounted on a common motherboard or in other manners as appropriate.

The memory stores information within the electronic control unit 190. In some implementations, the memory may be a volatile memory unit or units. In some implementations, the memory is a non-volatile memory unit or units. The memory may also be another form of computer-readable medium, such as a magnetic or optical disk. The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory, the expansion memory, or memory on the processor. In some implementations, the computer program product can be received in a propagated signal, for example, over the transceiver or the external interface. The mobile computing device may communicate wirelessly through the communication interface, which may include digital signal processing circuitry where necessary. The communication interface may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver using a radio-frequency. In addition, short-range communication may occur, such as using a Bluetooth, WiFi, or other such transceiver (not shown). In addition, a GPS (Global Positioning System) receiver module may provide additional navigation- and location-related wireless data to the mobile computing device, which may be used as appropriate by applications running on the mobile computing device.

The optional data storage device may be any physical storage medium, including, but not including a memory device that may be configured as a non-volatile and/or a volatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. In some examples, the memory device of the circuit board 191 may include one or more programming instructions thereon that, when executed, for example by one or more processors of the microcontroller, cause the one or more processors of the microcontroller to perform any operations described herein with respect to the ECU 190, and the throttle body assembly 110 as a whole. The microcontroller and/or the one or more processors thereof may be a computer processing unit (CPU), computing device, or combinations thereof. As such, the one or more processors may include any processing component configured to receive and execute instructions (such as from the data storage device and/or the memory device). The programming instructions stored on the memory may be embodied as a plurality of software logic modules, where each logic module provides programming instructions for completing one or more tasks, as described in greater detail with respect to the ECU 190 to, a hard disk drive (HDD), memory, removable storage, and/or the like.

The circuit board 191 also has a plurality of connectors 195 that are on one side of the circuit board 191 and which allow for connection of wiring quick connectors which may then extend from the electronic control unit 190. The quick connectors allow for removal of connections, for troubleshooting for example, as opposed to soldered connections that are potted in place. The quick connectors are not potted in some examples, and therefore the wires may be removed and/or replaced if needed with the quick connectors.

The housing frame 193 may also comprise a wire tray 196 that extends from the frame 193 and guides wire from the housing frame 193. Additionally, the housing frame 193 may comprise one or more alignment features which align with the circuit board 191, so that the frame 193 may be positioned appropriately relative to the circuit board 191.

Figure 9:
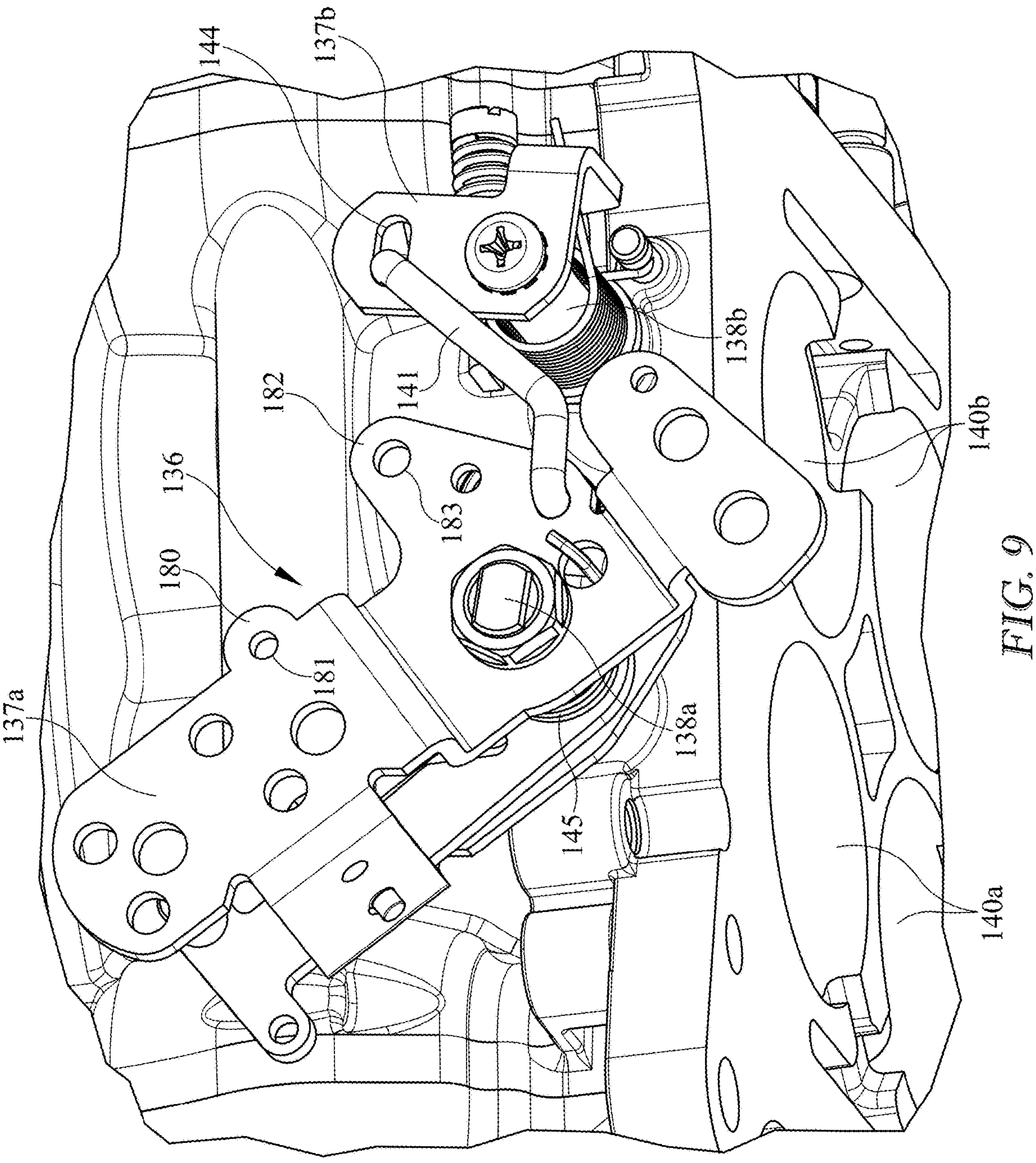
FIG. 9 is a detail perspective view of the throttle lever assembly.

With reference now to FIG. 9, a detail perspective view of the throttle lever assembly 136 is shown. The throttle lever assembly 136 also allows for the progressive opening and closing of the throttle valves or plates 139 and may be operated to have the same rates of movement, or differing rates for the throttle valves 139 of the two shafts 138. As shown in the Figure, the throttle lever assembly 136 comprises a primary throttle lever 137*a*. The assembly 136 is in communication with a mechanical throttle linkage (not shown) for example, which causes movement of the lever assembly 136 and specifically a throttle shaft 138 a connected to the lever assembly 136. The term throttle linkage may include various types of devices which cause movement of the throttle lever assembly 136 including but not limited to: wire(s), rod(s), plate(s), other structures or combinations thereof which move the assembly 136 to function. Additionally, in the embodiments where there are four bores, the second shaft 138*b* may be utilized. The second shaft 138*b* is hidden by a torsion spring 145 but the shaft 138*b* is also connected to a second throttle lever 137*b*.

As previously noted, the bores may be of the same diameter or different diameter. Additionally, the valves may open and close at the same rate or at different rates. For example, if the bores 140 are of different diameters, the valves of the primary (small) bores 140*a* and the secondary (large) bores 140*b* may not open and close at the same rate. Accordingly, the throttle lever 137*a* rotates some amount before the rotation of second throttle lever 137*b* and shaft 138*b* begins motion. The throttle lever assembly 136 comprises a throttle link, or linkage, 141 to drive and/or rotate a second lever 137*b* and shaft 138*b*. The second lever 137*b* has an arcuate opening 144 for engagement of the throttle link 141 which allows some movement of the first lever 137*a* before the second lever 137*b* begins to move. The shape of the opening 144 may be varied to affect when the secondary shaft 138*b* rotates and at what rate the opening of the valve occurs relative to the primary shaft 138*a* and primary valves. Also, the length and/or form of the throttle link 141 may be varied to change the timing of the opening of secondary valves. In the instant embodiment, the throttle link 141 is fixed and not adjustable. However in other embodiments, this throttle link 141 may be adjustable by bending or varying the length with a threaded rod for example. The throttle link, or linkage, 141, may be formed of a single rod as shown, or may defined by a wire, threaded rod, other structures or combinations of these. With rotation of the shaft 138 a, valve plates 139 (FIG. 5) located within the at least one bore 140*a*, 140*b* may rotate based on fuel/air need. At the opposite side of the throttle body 120, from the lever assembly 136 may be a magnet assembly 200 which in combination with a sensor 198 (FIG. 7) senses throttle shaft rotation and communicates to the electronic control unit 190 (FIG. 7.

In the instant embodiment, all of the throttle lever assembly 136 is provided on a single side of the throttle body assembly 110. This inhibits interference of moving parts with other non-moving parts such as wires. This also makes easier the wire routing process, so that only one area of the assembly 110 has to be avoided.

Still further, the first lever 137*a* is shown in a different form than in the previous figures. In the instant embodiment, the lever 137*a* is shown with upper lobes 180 and lower lobes 182 each with fastening apertures 181, 183. The lobes 180, 182 and hole 181, 183 allow for connection of various installation configurations and connection locations. In turn, this allows for use of the EFI throttle body assembly 110 in a variety of engine types, any of which may require different mounting configuration due to throttle linkages.

Figure 10:
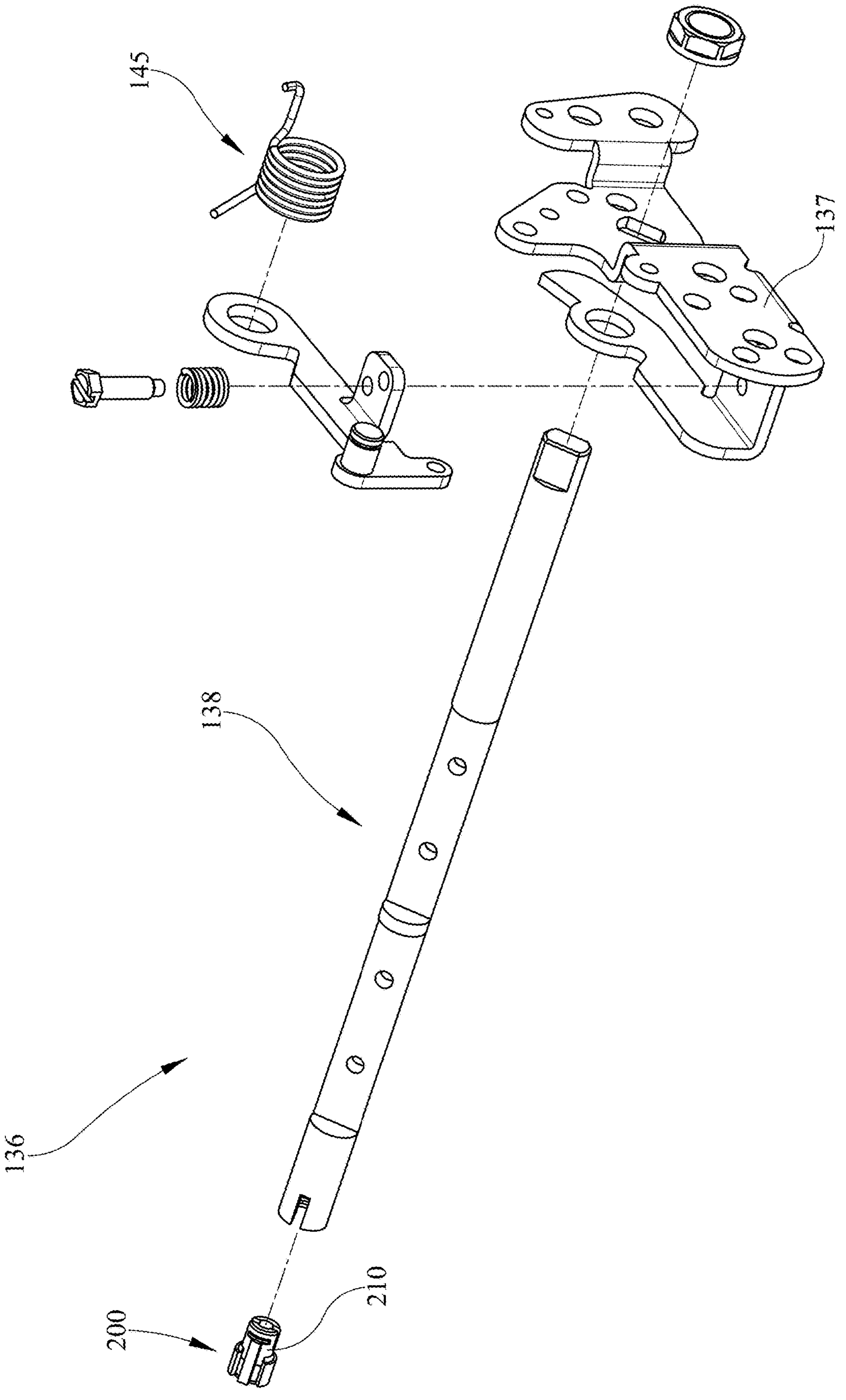
FIG. 10 is an exploded perspective view of the throttle lever assembly of FIG. 9.

Referring now to FIG. 10, an exploded view of the throttle lever assembly 136 is shown. The throttle lever assembly 136 comprises the throttle lever 137, the throttle shaft 138, and a magnet assembly 200 disposed at an end of the throttle shaft 138. With the throttle shaft 138 shown and the throttle plates or valves removed, the shaft 138 is shown with notched areas that may receive the throttle plates for seating and fastening. At one end of the throttle shaft 138, a flat key is cut into the shaft material for engagement with the throttle lever 137.

At an opposite end of the throttle shaft 138, the throttle lever assembly 136 may include a magnet housing 210. The magnet housing 210 may be a male part which is fit within a hollow area of the throttle shaft 138, or alternately may be a female part which is sized to fit over the outside of the throttle shaft 138. The magnet housing 210 may be formed with one or more keys which are fit within one or more keyways of the throttle shaft 138, so that movement of the throttle shaft 138 likewise results in rotation of the magnet housing 210. The magnet housing 210 may extend from an end of the throttle shaft 138 so that the magnet 214 is extending therefrom and can be sensed by the sensor 198 (FIG. 7) of the circuit board 191.

The throttle assembly 136 may further comprise a torsion or return spring 145 so that the throttle shaft 138 is biased to a normal position for engine idle. When the driver actuates the gas pedal, the lever is moved causing the rotation of the throttle shaft 138 to increase air and fuel flow. When force is removed from the gas pedal, the return spring 145 causes rotation of the throttle shaft 138 and plates 139 to the normal, idle position.

An additional arm is shown defining a transmission lever. The lever may be used for specific vehicle type and the plurality of holes provide that the lever may be changed to allow operation with other makes of vehicles.

Figure 11:
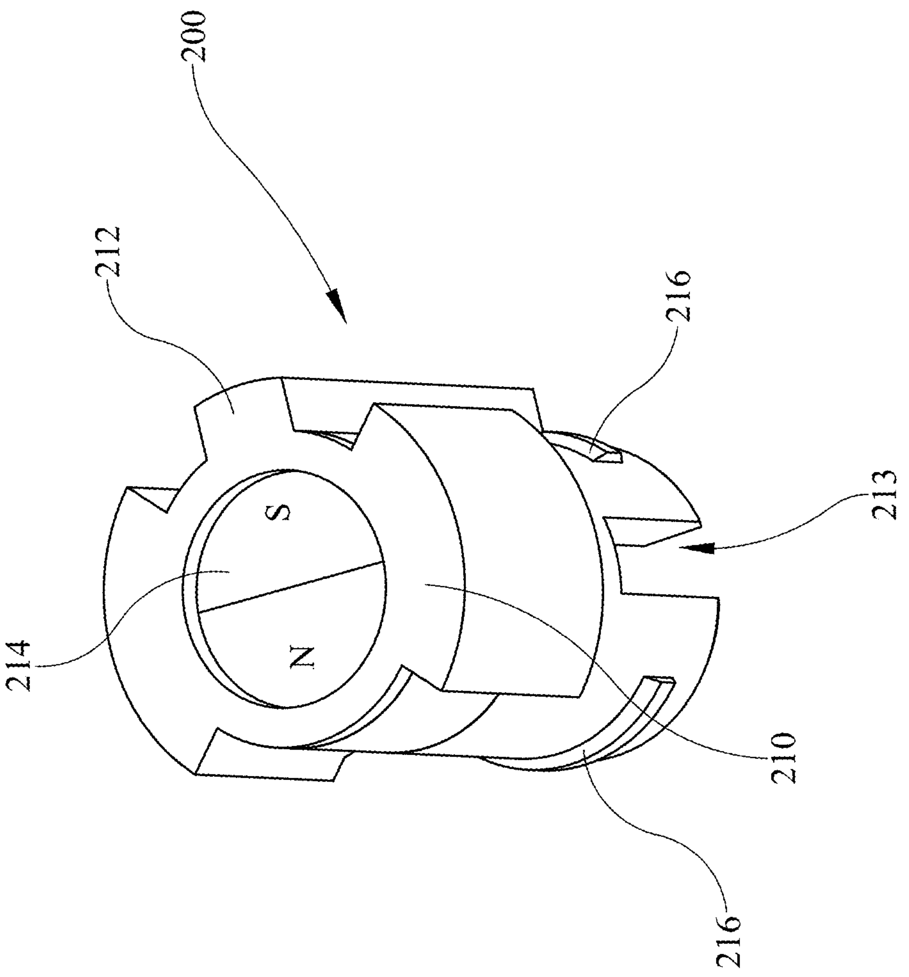
FIG. 11 is a perspective view of a magnet assembly which cooperates with the throttle shaft.

Referring now to FIG. 11, a detail view of the magnet assembly 200 is shown. The magnet housing 210 may have one or more keys 212 or keyways 213, or both, to correctly orient the housing 210 relative to the throttle shaft 138 and inhibit relative movement between the throttle shaft 138 and the magnet housing 210. In this way, the magnet housing 210 rotates with the shaft 138, so that the magnet position may be accurately related to the throttle shaft 138 position. The magnet housing 210 may have an axially inward portion which extends into the throttle shaft, and an axially outward portion that extends from an end of the throttle shaft. The axially inward portion has a reduced diameter allowing the housing to extend into the throttle shaft, and the axially outward end is of a larger diameter.

Within the housing 210, a magnet 214 is positioned. The magnet 214 may be a dual pole magnet according to some embodiments. The magnet housing 210 may also have one or more engagement cleats 216 on the outer surface to engage a feature on the interior of the throttle shaft.

The magnet 214 may be used in combination with a sensor 198 (FIG. 7) to make decisions. The decisions may be based, in part at least on angular position of the throttle shaft 138, between closed throttle position and wide open throttle position, for a variety of functions. The arrangement may provide allow for decision making and subsequent functions, including but not limited to: 1) determine throttle position in real time; 2) use real time throttle position to trigger various ECU functions; 2a) if throttle position is below a configurable threshold (i.e. below 2% total opening) idle control algorithms may be enabled; 2b) if throttle position is moved beyond a configurable threshold, a belt driven air conditioning compressor may be disabled; 3) use real time angular rate of change to calculate additional transient fuel delivery, mimicking the function of a carburetor's accelerator pump; 4) each time power is turned on (with the engine not running), a throttle angle measurement is taken by the ECU which is then saved as the base or 'zero' point—this measurement may be needed to ensure accuracy of the threshold triggered functions mentioned above; 5) allow for custom user definable functions and safeties using throttle position as a variable which may be configured through the software and/or app; 6) throttle position is converted to a DC voltage signal, 0.5 v=0% and 4.5 v=100% and can be used by external devices. A non-limiting example of this would be an electronic transmission controller which needs to know throttle position for upshifts/downshifts.

In operation, the electronic control unit 190 (FIG. 7) may use counted pulses to determine a location of the throttle shaft 138 for example as compared to an engine idle position. For example, the electronic control unit 190 (FIG. 7) may be programed to determine how the rotations of the throttle shaft 138 relates to the position of the throttle shaft 138, throttle valve plates 139 and fuel flow through the throttle body 110. In this way, the controller 190 may also control the volume or flow of fuel injected.

Figure 13:
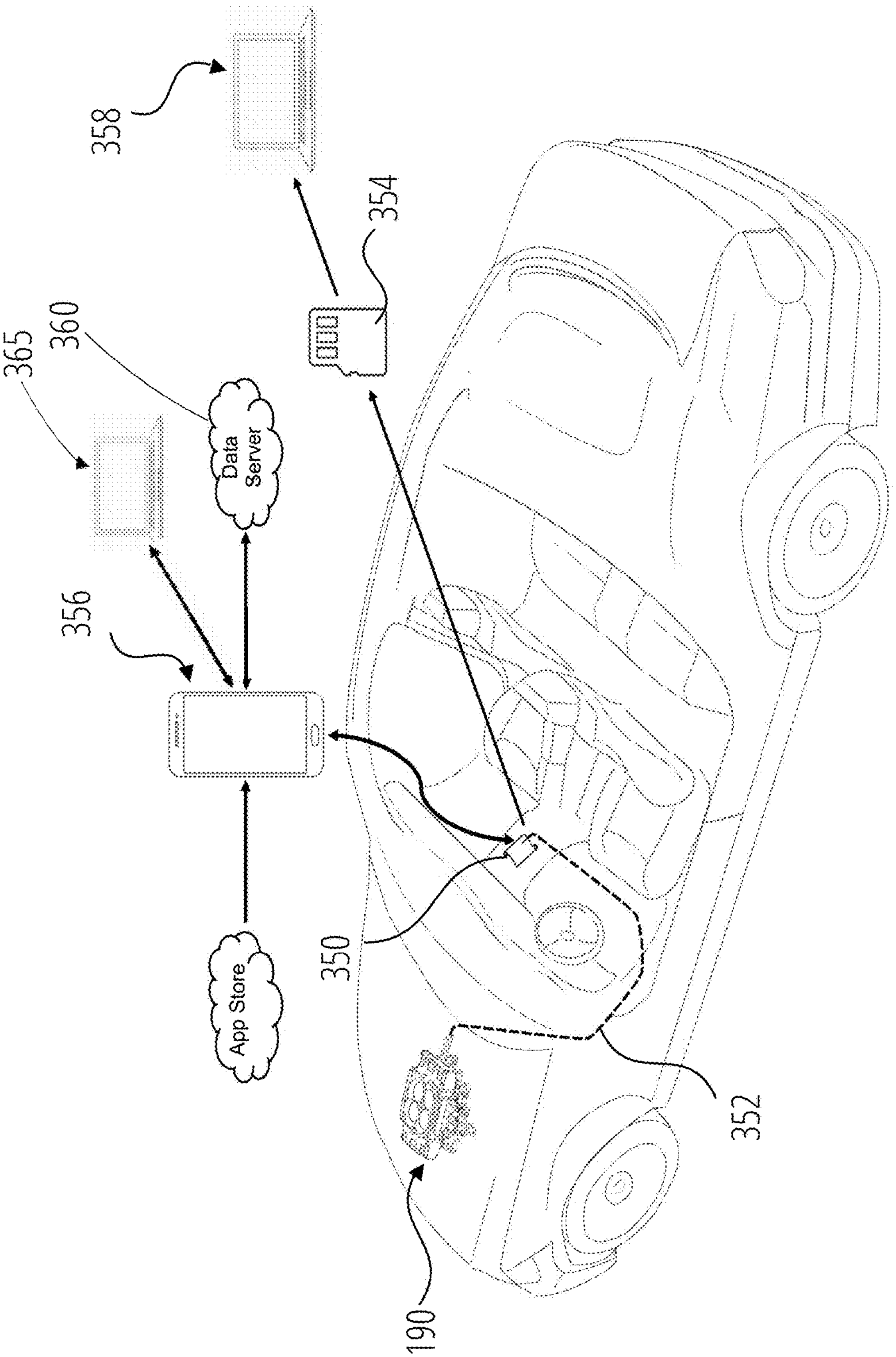

With brief reference to FIG. 13, the one or more throttle shafts 138 extends through the throttle body 120 extends into the housing 192 so that the magnet housing 210 (FIG. 11) and magnet 214 (FIG. 11) are adjacent to the sensor 198 of the circuit board 191. In some embodiments, one of the two shafts 138 (138*a*, 138*b*) may extend into the housing 192. The sensor 198 may be one or more sensors so that one or more signals are created during rotation of the shaft 138. Each time the magnet 214 (FIG. 11) within the magnet housing 210 passes the circuit board 191 sensor 198, the sensor 198 generates an output circuit board receives (e.g., a signal or pulse) of which that is sent (optionally after filtering or otherwise conditioning the output) to the control unit 190 (FIG. 7) by way of the quick connector. As described herein, the electronic control unit 190 (FIG. 7) utilizes a received output from the sensor 198, number of outputs, and/or rate(s) of received outputs from the generated between the magnet 214 and the sensor 198 to determine a position of the throttle shaft, or an amount of rotation, or other measure related to amount of rotational shaft displacement. As a result, the movement or rotation of the throttle shaft 138 may then be associated with a throttle amount. The magnet assembly 200 is positioned adjacent to the circuit board 191. The circuit board 191 may comprises a capacitor and resistor (not shown) which are used to filter the signal of noise or other artifacts. The circuit board 191 also includes an integrated circuit sensor 198. The sensor 198 may comprise a Hall Effect sensor which generates an output that is dependent on whether it senses at least a threshold magnetic field. For example, the sensor 198 may generate a first output (e.g., a logic high or low) when it senses the threshold magnetic field and may generate a second output (e.g., the other of a logic high or low) when it does not sense the threshold magnetic field. In some embodiments, the sensor 198 may generate more than two outputs, such as a plurality of outputs whose value is dependent on the strength of a sensed magnetic field. The various outputs may relate to various rotational positions, or rates of movement. When the throttle shaft 138 and the magnet assembly 200 rotate, the sensor 198 of the circuit board 191 generates an output that indicates the presence of at least a threshold magnetic field each time the magnet 214 within the magnet housing 210 passes thereby. With differing outputs, the controller 190 can make a determination of how much the throttle shaft 138 has rotated and/or the position of the throttle shaft 138. While one magnet 214 is shown, in some embodiments one or more magnets may be embedded in the magnet housing 210 and further, the spacing of the magnets may be equal or non-equal. Alternately, one magnet may be used and a plurality of sensors may be spaced about the magnet housing 210 on the circuit board 191, equally or unequally. The location/orientation of the magnetic poles (north and south) are detected by the stationary hall effect sensor, the sensor is able to measure this rotation as a linear output which is proportional to the rotational angle of the magnet.

In some embodiments, the output of the sensor 198 that indicates the magnetic flux density exceeds the threshold value may be an output voltage that is different than a normal voltage which is output from the sensor 198. For example, the normal voltage that is output from the sensor 198 may be a first voltage and the output that indicates the magnetic flux density exceeds the threshold value may be a voltage greater than the first voltage or in the alternative, the sensor 198 may have a normally zero voltage output and the output that indicates the magnetic flux density exceeds the threshold value may be some voltage greater than zero. In further embodiments, the sensor 198 may have a normal output voltage and the passing of the magnet causes the output to drop to zero or other lower output voltage temporarily. In still further embodiments, the normal output may be a first analog or digital signal (e.g., a first series of bytes) and the output that indicates the magnetic flux density exceeds the threshold value may be a second analog or digital signal (e.g., a second series of bytes). In any of these embodiments, the result is a pulse of some output in response to the magnet 214 passing by the sensor, which is either conditioned or directly provided to the electronic control unit 190. The conditioning may occur for example by a capacitor and resistor. Other structures may be utilized. In the depicted embodiments the rotation of the throttle shaft 138 causes rotation of the magnet 214. In some embodiments, the sensor 198 may produce a first output in response to sensing passing of the magnet 214 in a first direction, for example increasing throttle, and may produce a second output in response to sensing passing of the magnet 214 in a second direction, decreasing throttle. For example, the first and second outputs may be a positive voltage or a negative voltage depending on the sensed direction of rotation. For instance, the system may have three voltages including a first voltage representing a first direction, a second voltage representing a second direction, and a third voltage equaling no magnet sensed.

Still further, the throttle shaft positioning system may utilize one or more magnets 214. For example, a plurality of magnets may be spaced within the housing 210 at equal spacings or at differing spacings. In some embodiments, providing a plurality of magnets around the housing 210 may enable the electronic control unit 190 to determine the direction of rotation based on output provided by the sensor 198. For example, three or more magnets may be spaced apart with the circumferential distance between each adjacent pair of the magnets being different than the circumferential distance between the other adjacent pairs of the magnets. The electronic control unit 190 may determine the direction of rotation based on analysis of the time differences between a series of consecutive outputs from the sensor 198. For instance, assume magnets 1, 2, and 3 are circumferentially arranged in that order and that the circumferential distance between magnet 1 and magnet 2 is x mm, the circumferential distance between magnet 2 and magnet 3 is y mm, and the circumferential distance between magnet 3 and magnet 1 is z mm. The controller 190 may utilize these differences in spacing and/or signals in the two different directions to determine a direction of rotation. For example, the controller 190 may compare time differences between consecutive received outputs to forward and reverse direction profiles and determine to which profile the time differences conform.

In embodiments in which the controller 190 determines direction of rotation, other techniques may be utilized to determine the direction. For example, the sensor 198 may be configured to provide output that indicates direction. Also, for example, two sensors 198 may be arranged next to one another and may both provide output to the electronic control unit 190. The controller 190 may determine the direction based on the order in which outputs are received from the two sensors.

As outputs are generated by the sensor 198 in response to rotation of the magnet 214 relative to the sensor 198, the outputs are monitored by the electronic control unit 190 (FIG. 7). The ECU 190 receives the outputs in the form of a series of pulses that are stored by the controller 190, optionally in combination with time values that each indicate a time (an absolute time or a time relative to a previous pulse) when a respective pulse was received. In some embodiments, the electronic control unit 190 may count the number of pulses. Further, by determining the number of pulses over a period of time, the ECU 190 may determine the rate of pulses over that period of time may be determined. Rates of pulses for each of a plurality of periods of time may be stored or recorded by the controller, for example in the form of a lookup table and when a rate changes, the controller 190 (FIG. 7) can associate the change of rate with a condition of the EFI throttle body assembly 110.

Figure 12:
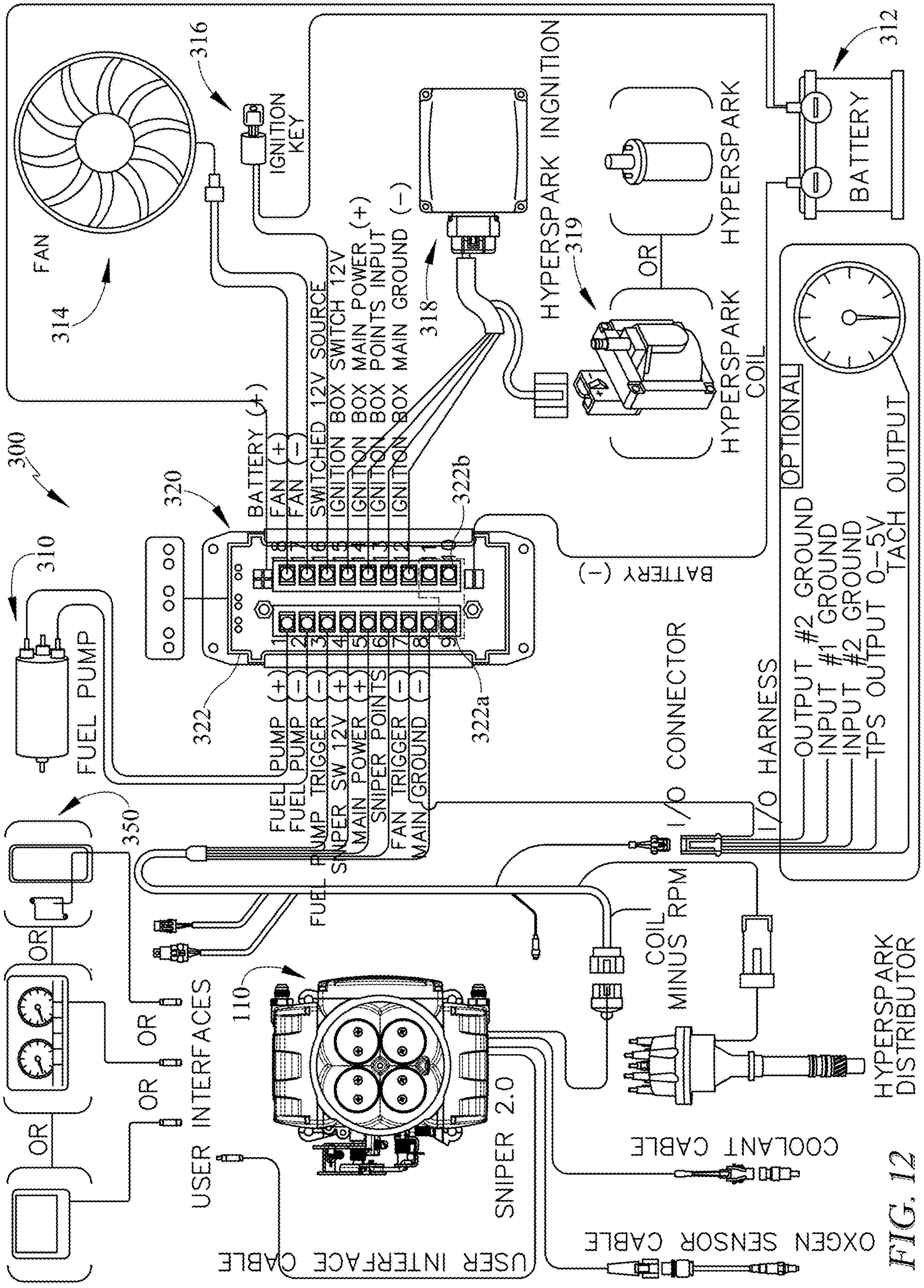
FIG. 12 is a schematic view wiring diagram of an example electronic fuel injection throttle body; and, FIG. 13 is a schematic view of a short range communication module which is remotely mounted from the EFI throttle body.

Referring now to FIG. 12, a schematic view of a wiring arrangement 300 is shown. The arrangement 300 shows various portions of the arrangement including the electronic fuel injection throttle body assembly 110, a fuel pump 310 which provides fuel to the electronic fuel injection throttle body assembly 110, a battery 312 which provides power for starting the engine 100 and which provides power to a power distribution module 320 to power one or more other devices.

The power distribution module 320 provides a plurality of connections 322 which may receive wires for ease of connection, as opposed to requiring a soldered connection for each wiring connection. The power distribution module 320 serves as a junction device and/or terminating block device that may be located in various locations in order to more easily make the connections for the wiring harness of the engine 100. This provides increased flexibility for making wiring connections and reduces the need to multiple individual wiring connections each of various electrical devices and the battery. The power distribution module 320 may control operation of one or more components, devices, or functional connections. For example, the power distribution module 320 may provide for connection of the main power (positive), ground, and switched ignition for the EFI throttle body. Additionally, for example, the power distribution module 320 may provide for connection of the fuel pump positive and ground. Still further, the power distribution module 320 may power, ground, and signal wire (points) for the ignition box 318 and coil 319. Even further in some embodiments, the power distribution module 320 may provide for connection and operation of the engine/radiator cooling fan 314 power, ground, and signal wire.

The power distribution module 320 provides a first side of connections **322*a* and a second side of connections 322*b* for plurality of wires routed to the power distribution module 320. The first side 322*a* may define a first column of connections and the second side 322*b*** may define a second column of connections. Each row of two connections are electrically connected and by way of logic programming, and additionally the connector of one column may be electrically connected to a connector of the second column, in a different row. Additionally, each output or connection may be protected against reverse polarity and/or overcurrent.

The power distribution module 320 may include connections for the vehicle battery 312, both (+) and (−), a fan 314, an keyed ignition switch 316, the ignition box 318, a capacitor discharge ignition, a transmission controller, the EFI throttle body assembly 110, a ground connection, the fuel pump 310, among other devices, interfaces, sensors, and the like. It should be understood that this list is not exhaustive and other devices may be connected.

The wiring diagram shows a connector from the EFI throttle body assembly 110 which provides multiple wires to the power distribution module 320. Additionally, the opposite side **322*b* of the power distribution module 320 may also include a plurality of connections for ignitions parts including the key ignition 316, and for ignition controller 318, or coils 319. Thus when installed, the power distribution module may be located in the engine bay or remotely from the engine bay. The wires for the various connector 322 may be routed to the power distribution module 320 and the individual connections may in the connectors 322. This way, use of the fasteners and the single power distribution module 320** precludes the need for individual soldered wiring connections.

Additionally shown in the wiring diagram 300 is a short range communications module 350, such as a Bluetooth® module. The short range communications module 350 may also be remotely located in the engine bay or exterior of the engine bay. The short range communications module 350 is connected electrically and for control to the EFI throttle body assembly 110 through the ECU 190. The short range communications module 350 also allows for short range communication with a smart device 356 (FIG. 13), such as a smart phone or smart pad or a computer, to monitor engine function, control engine functions, or change programming of the ECU 190 and alter operation of the EFI throttle body, which in turn alters or changes operating conditions of the combustion engine 100. Thus the short range communications module 350 provides a way of user interface, for example through a smart phone, with the ECU. By using the short range communications module 350, the communication may be moved away from places of poor communication or high heat, which might damage such module without losing the ability to communicate and monitor the EFI throttle body assembly 110 functionality.

Referring now to FIG. 13, a schematic view of a vehicle is shown, with the EFI throttle body assembly 110 shown in the engine compartment 114 and the short range communication module 350 shown in a second, remote location that is spaced from the throttle body assembly 110. In some embodiments, and without limitation, the short range module 350 may comprise a Bluetooth module as previously referenced, however other communication standards may be utilized. The short range communications module 350 allows for two-way communication with the ECU 190 of the EFI throttle body assembly 110. By two-way communication it should be understood that the user can send data to or receive data from the electronic control unit 190. Thus, a user can connect via short-range communication, for example Bluetooth standard, and monitor engine operating conditions, that is communication from the ECU 190 to the user. Alternatively, the user can direct functionality of the ECU 190 for example by setting engine operating characteristic, such as for non-limiting example idle speed. Thus, the user can connect via short range communication, and direct engine operating conditions via the short range communication.

The short range communications module 350 is also positionable in a space apart manner from the throttle body assembly 110, as shown schematically. In some examples, the short range communications module 350 comprises a communication cable 352, shown in broken line, that extends to the EFI throttle body assembly 110. The cable 352 may be positioned around or through the engine compartment 114 and through the firewall of the vehicle. This allows for placement of the Bluetooth module at some location within the vehicle compartment, if desired, such as a glove box, or within the dashboard, or other location. By moving the short range communications module 350 away from the engine compartment 114, the likelihood of interference from operating components, such as the engine ignition system in the engine compartment 114, is reduced or eliminated.

The communication cable may transmit data, such as CAN Bus data between the short range communications module 350 and the EFI throttle body 120. From the short range communications module 350, the data is sent to the app on the smart device 356 and may be interpreted for visual interface with the user. The Can Bus data may include, but is not limited to, ECU telemetry, internal ECU data such as firmware data, calibration information, serial number, amongst other data.

Also represented in the FIG. 13, the short range communications module 350 may be paired to smart devices 356 such as phones, pads, and/or laptop computers. In some examples, an application (or "app") may be utilized to provide communication and functionality with the ECU 190 of the EFI throttle body 120. In this way, the app and the smart devices 356 provide a graphical user interface remote from the throttle body assembly 110 and configured for the monitoring and/or the controlling operation of the throttle body assembly 110. That is, the short range communications module 350, the smart devices 256, the app, and/or the graphical user interface is an improvement in controlling operations of the throttle body assembly 110 such that the ECU 190 and/or the other components of the throttle body assembly 110 may be remotely monitored and/or controlled to control the combustion engine 100 in a desired manner. Such an arrangement permits, for example, and without limitation, updates to the ECU 190 to change or improve functionality within the EFI throttle body 120 without the need for direct cable links, visiting repair shops, and provides for instant communication and feedback, instant pushing of software improvements, and the like. Such improvements permit improvements in existing features of the ECU 190 and/or software, firmware, and the like, stored therein is used by components of the throttle body assembly 110 and/or adding additional features to the throttle body assembly 110. For example, and without limitation, improvements may include bug fixes, improving existing functionality, new module support, manufacturing support, customer satisfaction features, increased product applications, and the like.

The short range communications module 350 is also shown having a communication line to a personal computer (PC) 358. This may be wireless or wired communication, or by way of a shared memory storage device 354. For example, many laptops and desktop computers have short range communication devices that can interface with the short range communications module 350. Further however, the short range communications module 350 may comprise a memory device 354 such as for example a micro SD card which may be removed from the module 350 and inserted into a laptop or desktop PC computer. The data on the memory card 354 may be viewed on the PC with appropriate software. Such memory card 354 may comprise logged ECU data, for example, among other data.

The smart devices 356 may also be in communication a data server, such as a cloud server for example but without limitation. Such communication may allow for ECU 190 or the short range communications module 350 to receive and/or transmit and/or perform software and/or firmware updates, as discussed in greater detail above. Accordingly, when such data is available, it may be downloaded to the ECU 190 and pushed from the smart device 356 to the ECU 190 via the short range communications module 350. Additionally, the smart device 356 may provide, via the app, for communication with customer service and a connection for customer service representatives to aid in troubleshooting of the throttle body assembly 110. For example, and without limitation, the arrangement of the ECU 190 and/or the short range communications module 350 and/or the smart devices 356 permit for direct remote communication from the smart devices 356 to a remote or external computing devices 365 for diagnosis purposes, such as by an algorithm and/or by a human customer service. As such, this communication permits for direct communication of current data (e.g., datalog, calibration, and the like) from the ECU 190 and/or other components of the throttle body assembly 110 for remote, live, in real time, troubleshooting and providing guidance on live, in real time adjustments, and remotely receive instant feedback based on the adjustments. Example adjustments may include, without limitation, air-fuel ratio targets, idle speed changes, timing changes, fuel enrichments, and the like, to control or change operations of the combustion engine 100. As such, the ECU 190 may be configured to output control signals to execute adjustments to change operating parameters and/or outputs of the throttle body assembly 110 to control and/or change operations of the combustion engine 100 to behave in a desired manner. For example, the ECU 190 may be configured to execute changes in the operating parameters or outputs of the throttle body assembly 110 to control the combustion engine 100 such as changing fueling when in closed loop, using data from sensors, such as an oxygen sensor to add or subtract fuel, such that the data sensed by the oxygen sensor matches the target air fuel ratio, actuating an idle air control motor to change the idle air flow to manage the actual idle speed to a target idle speed, vary idle spark by adding or subtracting timing to maintain idle speed, and/or the like. As such, data signals are transformed by the ECU 190 into outputs from the ECU 190 that control or change operations of the combustion engine 100.

Further, the ECU 190 may determine positioning of the magnet 214 of the magnet assembly 200 to determine the throttle position of the throttle body assembly 110, as discussed in greater detail herein. Based on this data, diagnosis information or data may include a determination of rapid changes in throttle angle/position, which require extra fuel enrichment. Based on this diagnosis, acceleration enrichment tables use a rate of change of the throttle position to calculate the amount of additional fuel to provide, to prevent the combustion engine 100 from stumbling. That is, in response to a determination of a rapid changes in throttle angle or position based on the determination of an undesirable position of the magnet, the ECU 190 executes an acceleration fuel enrichment by the injection throttle body 110 to cause an increase in a throttle response in the combustion engine 100. Further, diagnosing the throttle position also dictates or permits for execution by the ECU

190 of specific algorithms, such as idle algorithm, wide-open throttle (WOT) algorithm, and the like, based on positioning of the magnet 214, such that the throttle body assembly 110 controls the combustion engine 100 as desirable. That is, in some embodiments, ECU 190 is configured to determine positioning of the magnet 214 to determine a throttle position of the throttle body assembly 110. The magnet 214 may be used for determination of the positioning of the shaft 138 so that the magnet 214 is extending therefrom and can be sensed by the sensor 198 (FIG. 7) positioned on the circuit board 191 (FIG. 7). In other embodiments, because the two shafts 138*a*, 138*b* are linked together with a mechanical link and known relationship to one another, the magnet 214 may be used for determination of the positioning of two shafts 138*a*, 138*b* can be sensed by the sensor 198 (FIG. 7) positioned on the circuit board 191 (FIG. 7). In response to the determination of an undesirable position of the magnet 214, the ECU may be configured to execute at least one of the idle algorithm or the wide-open throttle algorithm to change an operation of the electronic fuel injection throttle body 110, which in turn changes an output to the combustion engine 100 to change an operating condition of the combustion engine 100.

Further, this arrangement and use of the graphical user interface may also allow for various data to be viewed on the smart devices 356 and/or transmitted to the remote, external computing device. Example data may include, without limitation, datalogs captured, gauge screens, and the like. Further, this arrangement permits for file management between remote devices for real time diagnosis, and downloading and uploading data (e.g., loading calibrations, downloading calibrations, updating hardware with firmware, and the like).

An additional cloud 360 is shown which allows for downloading from an appropriate app store, the app which allows user interface and communications with the short range communications module 350 and the ECU 190. For example, and without limitation, in this embodiment, the cloud 260 may be used in addition to, or in place of the short range communications module 350 such that data may be provided in real time from the ECU 190 and/or other components of the throttle body assembly 110 to a remote or external computer for diagnosis purposes and to control the combustion engine 100, as discussed in greater detail above.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself.

For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An electronic fuel injection throttle body, comprising:

a throttle body having a first bore formed therethrough and including a throttle valve disposed in said first bore, and a second bore formed therethrough and including a second throttle valve disposed in said second bore;

a first fuel injector extending into said throttle body and a second fuel injector extending into said throttle body;

a channel disposed in each of said first bore and said second bore, said channel in fluid communication with a corresponding of said first fuel injector or said second fuel injector; and a plurality of openings in fluid communication with each said channel, whereby fuel is injected from said first or said second fuel injector into said first or said second bore through said plurality of openings;

a remote short range communications module configured for, providing and receiving data remotely from said electronic fuel injection throttle body;

an electronic control unit mounted to a side of said throttle body and communicatively coupled to said remote short range communications module; and a non-transitory, processor-readable storage medium in communication with the electronic control unit, the non-transitory, processor-readable storage medium comprising one or more programming instructions that, when executed, cause the electronic control unit to:

transmit and receive a plurality of data through the remote short range communications module to an external computing device;

receive inputs from the remote short range communications module in response to the plurality of data; and output control signals to the electronic fuel injection throttle body to change an operating condition of a combustion engine.

2. The electronic fuel injection throttle body of claim 1, wherein the plurality of data includes at least one of an electronic control unit telemetry, an electronic control unit firmware data, an electronic control unit calibration information data and an electronic control unit serial number data.

3. The electronic fuel injection throttle body of claim 1, wherein the control signals output by the electronic control unit to the electronic fuel injection throttle body adjust at least one of an air-fuel ratio target, an idle speed, a timing change, and a fuel enrichments.

4. The electronic fuel injection throttle body of claim 1, further comprising an integral fluid conduit formed in said throttle body extending between opposed sides of said throttle body.

5. An electronic fuel injection throttle body, comprising:

a throttle body having an upper inlet and a lower outlet;

a first bore and a second bore extending through said throttle body between said upper inlet and said lower outlet;

a throttle valve disposed in each said first bore and said second bore;

at least one first fuel injector extending into said throttle body on a first side toward said first bore;

at least one second fuel injector extending into said throttle body on a second side toward said second bore;

a first throttle shaft extending through said first bore and a second throttle shaft extending through said second bore, at least one said throttle valve mounted on each said throttle shaft;

a throttle lever assembly disposed on one side of said throttle body, said first throttle shaft and said second throttle shaft connected to said throttle lever assembly to rotate with movement of said throttle lever assembly; and an electronic control unit disposed on an opposite side of said throttle body from said throttle lever assembly, said electronic control unit having a recess which receives an end of one of said first throttle shaft or said second throttle shaft, wherein said end having a magnet to determine a throttle position of said one of said first throttle shaft or said second throttle shaft and wherein said electronic control unit receiving said end of said first throttle shaft or second shaft, said electronic control unit having the other of said magnet; and a non-transitory, processor-readable storage medium in communication with the electronic control unit, the non-transitory, processor-readable storage medium comprising one or more programming instructions that, when executed, cause the electronic control unit to:

determine a position of the magnet to determine the throttle position of the one of said first throttle shaft or said second throttle shaft;

transmit and receive a plurality of data through a remote short range communications module to an external computing device;

receive inputs from the remote short range communications module in response to the plurality of data; and in response to the determination of an undesirable position of the magnet, execute at least one of an idle algorithm or a wide-open throttle algorithm to change an operation of the electronic fuel injection throttle body.

6. The electronic fuel injection throttle body of claim 5, wherein the change of the operation of the electronic fuel injection throttle body is an output to change an operating condition of a combustion engine.

7. The electronic fuel injection throttle body of claim 5, wherein in response to a determination of a rapid changes in throttle angle or position based on the determination of an undesirable position of the magnet, execute an acceleration fuel enrichment by the electronic fuel injection throttle body to cause an increase in a throttle response in a combustion engine.

* * * * *